(12) United States Patent
Galiatsatos et al.

(10) Patent No.: US 11,124,618 B2
(45) Date of Patent: Sep. 21, 2021

(54) FOAMABLE POLYOLEFIN COMPOSITIONS AND METHODS THEREOF

(71) Applicant: LYONDELLBASELL ADVANCED POLYMERS INC., Houston, TX (US)

(72) Inventors: Vassilios Galiatsatos, Lebanon, OH (US); Fabio Ceccarani, Youngstown, OH (US); Chichang Shu, Mason, OH (US); Ryan Kramb, Monroe, OH (US); Ignazio Triassi, Wilmington, DE (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 195 days.

(21) Appl. No.: 16/441,983

(22) Filed: Jun. 14, 2019

(65) Prior Publication Data

US 2019/0382545 A1    Dec. 19, 2019

Related U.S. Application Data

(60) Provisional application No. 62/685,133, filed on Jun. 14, 2018.

(51) Int. Cl.
*C08J 9/00* (2006.01)
*C08F 210/02* (2006.01)
(Continued)

(52) U.S. Cl.
CPC ........... *C08J 9/0061* (2013.01); *C08F 210/02* (2013.01); *C08F 210/06* (2013.01); *C08J 3/22* (2013.01);
(Continued)

(58) Field of Classification Search
CPC ..... C08J 9/0061; C08J 9/06; C08J 9/12; C08J 9/122; C08J 9/141; C08J 9/143;
(Continued)

(56) References Cited

U.S. PATENT DOCUMENTS 9,187,610 B2 * 11/2015 Hisayama ............... C08L 23/12
2009/0030098 A1 * 1/2009 Cagnani .................. C08L 23/10
521/134

(Continued)

FOREIGN PATENT DOCUMENTS

EP    3385073 A1    10/2018
EP    3406441 A1    11/2018
(Continued)

OTHER PUBLICATIONS

JP 2005220303 A Derwent summary (Year: 2005).*
International Search Report and Written Opinion dated Sep. 11, 2019 (Sep. 11, 2019) for Corresponding PCT/US2019/037293.

*Primary Examiner* — Michael M Dollinger
*Assistant Examiner* — Christina H. W. Rosebach

(57) ABSTRACT

Foamed reactor made thermoplastic polyolefins (rTPOs), and articles made therefrom, are described. The compositions have an rTPO combined with a foaming agent. The foaming agent can be a physical blowing agent and/or a chemical foaming agent, and may include optional nucleating agents. Some compositions utilize a masterbatch having one or more chemical foaming agents to foam the rTPOs. The rTPOs have a large melt flow rate range and flexural modulus range that translate into a broad scope of potential applications and foamed architecture. This allows the combination of rTPOs and foaming agents to be fine-tuned for selected foaming application.

7 Claims, 8 Drawing Sheets

(51) Int. Cl.
  *C08F 210/06* (2006.01)
  *C08J 3/22* (2006.01)
  *C08J 9/12* (2006.01)
  *C08J 9/14* (2006.01)
  *C08K 5/00* (2006.01)
  *C08J 9/06* (2006.01)

(52) U.S. Cl.
  CPC . *C08J 9/06* (2013.01); *C08J 9/12* (2013.01); *C08J 9/122* (2013.01); *C08J 9/141* (2013.01); *C08J 9/143* (2013.01); *C08K 5/0083* (2013.01); *C08J 2201/024* (2013.01); *C08J 2203/06* (2013.01); *C08J 2203/14* (2013.01); *C08J 2323/08* (2013.01); *C08J 2323/12* (2013.01); *C08J 2323/14* (2013.01); *C08J 2423/08* (2013.01); *C08J 2423/12* (2013.01)

(58) Field of Classification Search
  CPC ............... C08J 2323/10–16; C08J 3/22; C08J 2201/024; C08J 2203/14; C08J 2423/14; C08J 2423/08; C08J 2423/12; C08F 210/02; C08F 210/06
  See application file for complete search history.

(56) References Cited

U.S. PATENT DOCUMENTS

| | | | | |
|---|---|---|---|---|
| 2011/0233449 | A1* | 9/2011 | Lunghi | C08J 9/0061 |
| | | | | 252/62 |
| 2018/0009152 | A1* | 1/2018 | Gomibuchi | B29C 49/58 |
| 2018/0281260 | A1* | 10/2018 | Ben-Daat | B32B 27/40 |
| 2018/0281358 | A1* | 10/2018 | Ben-Daat | B29C 48/21 |
| 2020/0207960 | A1* | 7/2020 | Mileva | C08K 5/092 |

FOREIGN PATENT DOCUMENTS

| | | | |
|---|---|---|---|
| JP | 2005220303 A | * | 8/2005 |
| JP | 2005220303 A | | 8/2005 |
| WO | 2007003523 A1 | | 1/2007 |
| WO | 2010069687 A1 | | 6/2010 |

* cited by examiner

FIGURE 2

| | Extruder 1 | Extruder 2 | Extruder 3 | |
|---|---|---|---|---|
| Comments | MONOLAYER WITH 1.5% MASTERBATCH A | | | |
| Resin Information | Extruder 1 | Extruder 2 | Extruder 3 | Air Knife  On |
| | Outer | Tie | Center | 3 / 5 Layer  MONOLAYER |
| | Top | Center | Bottom | |
| Supplier | LYB | LYB | LYB | |
| Resin | Q100F (w/Foam agent) | Q100F (w/Foam agent) | Q100F (w/Foam agent) | Rolls O / C  Closed |
| Batch | RC22BAF01 | RC22BAF01 | RC22BAF01 | Roll Pressure  60 |
| Chill Roll | A  SPt 70  Act 0 | B  SPt 70  Act 0 | C  SPt 70  Act 0 | Sheet Gauge  40 MIL |
| Screw # | F10323 BARRIER | 710 General Purpose | 711 General Purpose | Dial  0.75 |
| Barrel Zone 1 | SPt 385  Act 385 | SPt 385  Act 385 | SPt 385  Act 385 | Screen Pack Extruder 1 |
| Barrel Zone 2 | SPt 420  Act 420 | SPt 420  Act 420 | SPt 420  Act 420 | 60/60 |
| Barrel Zone 3 | SPt 375  Act 375 | SPt 365  Act 365 | SPt 365  Act 365 | Screen Pack Extruder 2 |
| Clamp Ring | SPt 365  Act 365 | SPt 365  Act 365 | SPt 365  Act 365 | 60/100/150 |
| Adapter | SPt 365  Act 365 | SPt 365  Act 365 | SPt 365  Act 365 | Screen Pack Extruder 3 |
| Melt Temp | Act 397 | Act 395 | Act 378 | 60/100/60 |
| Die Lower | | SPt 365  Act 365 | AE Chiller | Chill Roll Take Up (FPM) |
| Die Upper | | SPt 365  Act 365 | Act 0 | 3 |
| Screw RPM | 67.1 | 61.7 | 61.7 | |
| Motor | Load (%)  9.3 | Amps  2.9 | Amps  2.7 | |
| Head Pressure | 1 | 1.0 | 1 | |

FOAMABLE POLYOLEFIN COMPOSITIONS AND METHODS THEREOF

PRIOR RELATED APPLICATIONS

This application claims the benefit of U.S. Provisional Application No. 62/685,133, filed on Jun. 14, 2018, which is incorporated herein by reference in its entirety for all purposes.

FIELD OF THE DISCLOSURE

The disclosure relates to polyolefin compositions, particularly to reactor made thermoplastic polyolefin compositions to be foamed or expanded.

BACKGROUND OF THE DISCLOSURE

Polyolefins have been frequently used in commercial plastics applications because of their outstanding performance and cost characteristics. These polymers can be either amorphous or highly crystalline, and they can behave as thermoplastics, thermoplastic elastomers, or thermosets. As such, polyolefins are easily designed and modified for select applications by properly selecting their molecular structure and molecular weight distribution(s) to obtain a suitable balance of stiffness, impact resistance, and processability in the extrusion processes.

One area of increased interest in polyolefins is the formation of foams. Polyolefin foams have become a very important part of the polymer industry due to their beneficial characteristics, including light weight, superior cushioning, heat insulation, and resistance to water and chemicals.

Although polyolefin foams are relatively recent additions to the range of polymeric foam materials, having been first marketed in the early sixties, they have found a use in almost every industry. Areas of application include packaging, sports and leisure, toys, insulation, automotive, military, aircraft, buoyancy, cushioning and others. This broad scope of applications results from the wide range of physical properties of the olefins, from hard and tough to soft and resilient. Hard (though not brittle) foams are obtained using e.g. high density polyethylene as the base polymer, while softer materials are obtained using ethylene co-polymers such as ethylene vinyl acetate (EVA). This ability to vary foam properties by changes in the polymer is similar to that seen in polyurethane foams, although the technologies are different since almost all polyurethane foams result from liquid technology with in situ polymerization and blowing while polyolefin foams are produced starting with the basic thermoplastic polymer.

With the advanced developments of polymerization techniques, polyolefin use has been rapidly expanding in foam applications through various chemical and physical forms, including cross-linked polyolefins, co-polymers, high melt strength (branched) polyolefins, and polyolefin blends. However, despite the advances made in foaming polyolefins, there is a continued need for the development of improved foamable compositions having increased strength, foamability, cell consistency, dimensional stability, and temperature resistance, without added costs to the manufacturing process. Ideally, the new foamable compositions would also reduce carbon footprint by being compatible with polyolefin recycle streams.

SUMMARY OF THE DISCLOSURE

The present disclosure provides novel foamed polyolefin compositions with improved physical properties. Specifically, the foamable compositions comprise reactor made thermoplastic polyolefins (rTPOs) that are foamed by a chemical or physical foaming agent. Various articles can be made with the foamed rTPOs.

The rTPOs were selected because of their improved properties over compounded TPOs, and lower costs associated with eliminating the compounding step. The reactor polymerization process allows for better impact/stiffness balance, thermal resistance, cold temperature impact, creep resistance, wide range of flexural modulus, extreme toughness, high heat resistance, exceptional puncture resistance, and controlled shrinkage when compared to the compounded TPOs.

The foamed rTPO compositions and articles described herein are comprised of an rTPO component, a foaming agent, and optionally one or more nucleating agents. Any rTPO can be used in the present compositions. In some embodiments, the rTPOs have both polypropylene and polyethylene portions. Polypropylene provides the rigidity and temperature stability, whereas elastomers such as polyethylene provide the flexibility and impact strength to the rTPOs. The inclusion of polypropylene and polyethylene in the rTPO allows for a breadth of applications for the resulting foams.

In some embodiments, the rTPO is a heterophasic copolymer, wherein a propylene homopolymer or a random copolymer (RACO) with ethylene is mixed with a bipolymer. In other embodiments, the rTPO contains three components: A) a semi-crystalline propylene homopolymer, or random copolymer with ethylene or other alpha-olefins; B) a polyethylene homopolymer, or a polyethylene copolymer with 1-butene or other alpha-olefins; and, C) an elastomeric component consisting of a copolymer of propylene, ethylene, and optionally 1-butene. In yet more embodiments, the rTPO is prepared using a multi-stage gas phase polymerization process.

To obtain the foamed rTPO compositions and articles made from the foamed rTPO compositions of the present disclosure, the chosen rTPO is foamed using processes and foaming agents known in the art, including both physical and chemical types.

Any physical blowing agents (PBA), also known as physical foaming agents, can be used to foam the rTPO base resin, including, but are not limited to, highly pressurized $CO_2$, $N_2$, air, propane, isobutane, butane, CFC-derivatives, argon and/or combinations thereof.

The PBAs can be metered into the base resin's melt during foam extrusion or foam injection molding. The PBAs may be injected or introduced in the molten polymer mass in the extruder at a distance from the point where the solid polymer is fed, where the polymer is found melted and homogeneous. When the pressurized PBAs are injected directly into the melt, they expand when returning to atmospheric pressure, forming minute cells within the polymer.

To promote cell formation when using PBAs as foaming agents, the rTPO may be combined with a masterbatch containing at least one nucleating agent. A nucleating agent is useful for resins with a polypropylene component, as the nucleating agent can impart property enhancement, improved molding or extrusion productivity, and increased transparency to the rTPO. To ensure proper dispersion of the nucleating agents, the masterbatch uses a carrier resin that is compatible with at least one polymer or monomer in the polyolefin, such as polyethylene or polypropylene. For instance, a polyethylene carrier resin would be compatible with the bipolymer phase of the rTPO. This allows for consistent cells morphologies with controlled size distributions throughout the extruded and foamed rTPO.

In other embodiments, the rTPO base resin is foamed using at least one chemical foaming agent (CFA). CFAs produce/release gas when decomposed wherein the gas imparts a cellular structure to the material. The CFA gas remains dissolved in the polymeric melt while the melt is under pressure. When the melt is injected into the mold or extruded, the pressure is reduced allowing the gas to expand the polymer.

As with the nucleating agent, a masterbatch may be used to ensure proper dispersion of the CFA(s), and the carrier resin in the masterbatch is compatible with at least one component in the rTPO base resin.

The CFA(s) can be endothermic or exothermic. Endothermic is desired, as the CFA tends to be more stable in the blend and does not decompose and produce gas until exposed to heat in the extrusion process. Further, the CFA(s) may also act as a nucleating agent to promote cell formation in the rTPO base resin. A nucleating chemical foaming agent is useful for resins with a polypropylene component, as the nucleating agent can impart property enhancement, improved molding or extrusion productivity, and increased transparency to the rTPO. However, nucleating abilities are not needed for the CFA.

The masterbatches used for distributing CFAs contain at least one chemical foaming agent but can also have a mix of chemical foaming agents in a variety of concentrations. In some embodiments, the masterbatch can have CFA(s) and optional nucleating agents separate from the CFA(s). Alternatively, a mixture of chemical foaming agents, both nucleating and non-nucleating, can be used in the masterbatch to fine-tune the characteristics of the resulting foam, such as cell size, cell distribution, and cell stability for selected applications. In yet another alternative, multiple masterbatches can be combined to provide the desired CFA(s) and optional nucleating agents.

The articles formed using the foamed rTPO compositions described herein are not limited to any specific architecture. The foams can be extruded in-line during processing in many shapes, including sheets, strands, tubes, containers, or custom profiles specific to certain applications, which eliminates the need and additional costs for secondary processing steps. Alternatively, the foams can be injection molded. In yet another alternative, the foams can also be layered, or combined with other polyolefin resins as needed for specific applications. For instance, foamed articles made from the rTPOs can be used as a core layer with one or more outside layers made of a solid polyolefin. As such, the physical properties of the polyoefins, the tunability of the foam's cellular structure using mixes of CFAs and optional nucleating agents, and the extensive architectures available, combine synergistically to allow for a broad scope of applications. In either case, the gas should be completely dissolved in the polymer melt and kept under appropriate pressure until released from the die.

The present disclosure includes any of the following embodiments in any combination(s):

A foamed composition comprising a propylene-based rTPO having a flexural modulus lower than 60 MPa, a Shore A hardness lower than 90, a tension set at 100% lower than 35%, and a melt flow rate between 0.1 and 10 g/10 min, wherein the melt flow rate values are measured according to ASTM D 1238. The propylene-based rTPO can have the following fractions: (A) from about 8 to 25% by weight of a crystalline polymer fraction selected from the group consisting of (i) a propylene homopolymer having solubility in xylene at room temperature lower than 10% by weight; and (ii) a copolymer of propylene and at least one alpha-olefin of formula $H_2C\!=\!CHR$, where R is H or a $C_2\text{-}C_6$ linear or branched alkyl, containing at least 85% by weight of propylene, having solubility in xylene at room temperature lower than 15% by weight; and (B) from about 75 to 92% by weight of an elastomeric fraction comprising (i) a first elastomeric copolymer of propylene with at least one alpha-olefin of formula $H_2C\!=\!CHR$, where R is H or a $C_2\text{-}C_6$ linear or branched alkyl, optionally containing 0.5 to 5% by weight of a diene, the first elastomeric copolymer containing from about 15 to 32% by weight alpha-olefin, and having solubility in xylene at room temperature greater than 50% by weight, the intrinsic viscosity of the xylene soluble fraction ranging from about 3.0 to 5.0 dl/g; and (ii) a second elastomeric copolymer of propylene with at least one alpha-olefin of formula $H_2C\!=\!CHR$, where R is H or a $C_2\text{-}C_6$ linear or branched alkyl, optionally containing 0.5 to 5% by weight of a diene, the second elastomeric copolymer containing more than 32% up to 45% by weight alpha-olefin, and having solubility in xylene at room temperature greater than 80% by weight, the intrinsic viscosity of the xylene soluble fraction ranging from about 4.0 to 6.5 dl/g. The (Bi)/(Bii) weight ratio ranges from about 1:5 to 5:1.

A foamed polyolefin composition comprising a propylene-based rTPO having an intrinsic viscosity $[\eta]$ of a fraction soluble in xylene at room temperature (XS) of 1.8 dl/g or more. This rTPO can have: (A) 10-70% of a copolymer of propylene and one or more co-monomer(s) selected from ethylene and $CH_2\!=\!CHR$ alpha-olefins where R is a 2-8 carbon alkyl, wherein the copolymer contains from about 0 to 8% of co-monomer(s); and, (B) 30-90% of a copolymer of ethylene and (i) propylene or (ii) $CH_2\!=\!CHR$ alpha-olefins, where R is a 2-8 carbon alkyl radical, or (iii) a combination thereof, optionally with minor amounts of a diene, with this copolymer containing from about 50% to 80% of ethylene.

A foamed polyolefin composition comprising a propylene-based rTPO having a melt flow rate between 1.0 and 5.0 g/10 min. This rTPO can have: (A) 5-35% by weight of a propylene-based polymer containing 90% by weight or more of propylene units and 10% by weight or less of a fraction soluble in xylene at 25° C.; (B) 25-50% by weight of an ethylene homopolymer containing 5% by weight or less of a fraction soluble in xylene at 25° C.; and, (C) 30-60% by weight of a copolymer of ethylene and propylene containing from about 25% to 75% by weight of ethylene units and containing from about 55% to 95% by weight of a fraction soluble in xylene at 25° C. In some embodiments, the total content of the ethylene units (as determined by infrared analysis) in this rTPO can be 50% by weight or higher.

A foamed polyolefin composition comprising a propylene-based rTPO having a melt flow rate between 0.1 and 6 g/10 min. This rTPO can have: (A) 5-35% by weight of a propylene-based polymer containing 90% by weight or more of propylene units and 10% by weight or less of a fraction soluble in xylene at 25° C.; (B) 25-50% by weight of a copolymer of ethylene and a $C_{3\text{-}8}$ alpha-olefin containing from about 0.1% to 20% by weight of alpha-olefin units and 75% by weight or less of a fraction soluble in xylene at 25° C.; and, (C) 30-60% by weight of a copolymer of ethylene and propylene containing from about 25% to 75% by weight of ethylene units and containing from about 55% to 95% by weight, of a fraction soluble in xylene at 25° C. In some embodiments, the total content of the $C_{3\text{-}8}$ alpha-olefin units (as determined by infrared analysis) in this rTPO can be 3% by weight or higher.

A foamed polyolefin composition comprising a propylene-based rTPO having a MFR between 0.35 and 1 g/10 min, and an intrinsic viscosity of the xylene soluble fraction from about 4 dL/g to 6 dL/g (in decalin). This propylene-based rTPO can have: (A) about 30% to less than 70% of a semi-crystalline polypropylene component selected from the group consisting of a propylene homopolymer, a random copolymer of propylene containing up to 8% of ethylene, a random copolymer of propylene containing up to 8% of at least one $C_4$-$C_{10}$ α-olefin, or any combination thereof, wherein the semi-crystalline polypropylene component has a monomodal molecular weight distribution; and, (B) greater than 30% to about 70% of a bipolymer component of propylene and at least one co-monomer selected from ethylene and/or $C_4$-$C_{10}$ α-olefins, wherein the bipolymer itself has from about 50%-75% of propylene, wherein the bipolymer is partially soluble in xylene at room temperature and has an intrinsic viscosity of from about 4 to 7.5 dl/g (in decalin).

A foamed polyolefin composition comprising a propylene-based rTPO having a MFR between 0.35 and 35 g/10 min. This propylene-based rTPO can have: (A) 10-60 parts by weight of a homopolymer of propylene with isotactic index greater than 80, or a copolymer having over 85% by weight of propylene with (i) ethylene or (ii) $CH_2$=CHR alpha-olefins, where R is a 2-8 carbon alkyl radical, or combinations of (i) and (ii); (B) 5-20 parts by weight of a copolymer fraction containing ethylene that is insoluble in xylene at ambient temperature; and (C) 37-80 parts by weight of a copolymer fraction of ethylene and (i) propylene or (ii) another $CH_2$=CHR α-olefin, or combinations of (i) and (ii), and, optionally, minor portions of a diene, wherein component (C) is less than 40% by weight of ethylene, being soluble in xylene at ambient temperature, and having an intrinsic viscosity from about 1.5 to 5 dl/g, wherein the percent by weight of the sum of the (B) and (C) components with respect to the total polyolefin composition is from about 40% to 90% and the (B)/(C) weight ratio is lower than 0.4.

A foamed polyolefin composition comprising a propylene-based rTPO having a MFR between 0.8 and 20 g/10 min. This rTPO can have: (A) 5-35% by weight of a propylene and ethylene copolymer having 15% by weight or less of a fraction soluble in xylene at 25° C. (XSA) referred to the weight of A, and having from about 0.5 wt % to 7.0 wt % of ethylene derived units; (B) 20-50% by weight of an ethylene homopolymer having 5% by weight or less of a fraction soluble in xylene at 25° C. ($XS_B$) referred to the weight of (B); and, (C) 30-60% by weight of a terpolymer, wherein the terpolymer contains propylene, about 45% to 65% by weight of ethylene derived components, and from about 15% to 38% by weight of 1-butene derived components, wherein the terpolymer has from about 30% to 85% by weight of a fraction soluble in xylene at 25° C. ($XS_c$), the amount of ethylene units; 1-butene units and the fraction $XS_C$ being referred to the weight of (C), wherein the total weight of (A)+(B)+(C) is 100 wt %.

A foamed polyolefin composition comprising a propylene-based rTPO having a MFR between 0.8 and 20 g/10 min. This rTPO can have: (A) 5-35% by weight of a propylene homopolymer containing 10% by weight or less of a fraction soluble in xylene at 25° C. ($XS_A$), the amount of the fraction XSA being referred to the weight of A); (B) 20-50% by weight of an ethylene homopolymer having 5% by weight or less of a fraction soluble in xylene at 25° C. ($XS_B$) referred to the weight of (B); and, (C) 30-60% by weight of a terpolymer, wherein the terpolymer contains propylene, about 45% to 65% by weight of ethylene derived components, and from about 15% to 38% by weight of 1-butene derived components, wherein the terpolymer has from about 30% to 85% by weight of a fraction soluble in xylene at 25° C. ($XS_C$), the amount of ethylene units; 1-butene units and the fraction XSC being referred to the weight of (C), wherein the total weight of (A)+(B)+(C) is 100 wt %.

A foamed polyolefin composition comprising a propylene-based rTPO having a MFR between 5 and 20 g/10 min. This propylene-based rTPO can have: (A) from about 60 to 85% of a broad molecular weight distribution propylene polymer having a polydispersity index from about 5 to 15 and melt flow rate of from about 40 to 75 g/10 min; and (B) from about 15 to 40% of a partially xylene-soluble olefin polymer rubber consisting of a poly(ethylene-co-propylene) containing at least 65% by weight of ethylene, wherein the xylene-insoluble content of (B) is 25-40% by weight, measured by dissolving the polymer in xylene at 135° C., cooling the solution to 25° C., allowing to settle for 30 minutes, followed by filtering.

A foamed polyolefin composition comprising a propylene-based rTPO having: (A) from about 25 to 50%, by weight, of a crystalline propylene homopolymer with a solubility in xylene at room temperature of less than or equal to 4%, or a crystalline copolymer of propylene with ethylene or a $C_4$-$C_8$ alpha-olefin having an ethylene or alpha-olefin content 0.5 to 3%, and a solubility in xylene at room temperature of from less than or equal to 4%; and, (B) from about 50 to 75%, by weight, of a partially amorphous copolymer of ethylene with a $C_4$-$C_8$ alpha-olefin, wherein the alpha-olefin content is from about 10 to 20%, and the copolymer is from about 10 to 40% soluble in xylene at room temperature.

Any of the above foamable compositions were foamed using a chemical foaming agent (CFA) or a physical blowing agent (PBA).

In any of the above foamed compositions, at least one masterbatch having at least one chemical foaming agent is added to the rTPO resin before melting, wherein the carrier resin for the masterbatch is compatible with at least one polymer or monomer in the rTPO resin.

In any of the above foamed compositions, the chemical foaming agent can be an endothermic or exothermic foaming agent. Alternatively, the chemical foaming agent can act as a nucleating agent.

In any of the above foamed compositions, at least one masterbatch having at least one chemical foaming agent and optionally, at least one nucleating agent is added to the rTPO resin before melting.

In any of the above foamed compositions, a physical blowing agent and a masterbatch containing a nucleating agent are used to produce the foamed composition.

In any of the above foamed compositions, the total amount of combined masterbatches in the foamed composition is 5% by weight or less of the final composition, or 10% by weight or less of the final composition. Alternatively, the total amount of combined masterbatches in the foamed composition is between 0.25 and 3% by weight of the final composition or between 8 and 10% by weight of the final composition. In yet another alternative, the final concentration of the masterbatch(es) in the foamed resin may be 2.5 wt % or 3 wt % or 5 wt % or 8 wt % or 10 wt %.

In any of the above rTPOs, the α-olefin is selected from a group comprising ethylene, propylene, 1-butene, 1-pentene, 1-hexene, 4-methyl-1-pentene and 1-octene.

An article prepared using any of the above foamed compositions. Alternatively, an article prepared using any of the above foamed compositions, wherein the article is in the form of sheets, strands, tubes, containers, or custom profiles specific to certain applications.

A method of producing any of the above foamable polyolefin compositions with a chemical foaming agent, the method involving dry-blending the rTPO and masterbatch(s), melting the composition, extruding the composition through a die, wherein the chemical foaming agent degrades to release gas, and forming one or more closed cells in the melted rTPO with the released gas. Multiple chemical foaming agents can be used in this method to release gas during the extruding step, including the use of a nucleating agent that also acts as a chemical foaming agent. The extrusion step can produce a foamed sheet, strand, tube, container, or other extruded article.

A method of producing any of the above foamable polyolefin compositions, using a dry-blending a rTPO and masterbatch(es), melting the composition, extruding composition through a die, wherein the chemical foaming agent degrades to release gas, forming one or more closed cells in the melted rTPO with the released gas. The density of the foamed rTPO can be up to 80% lower than an unfoamed rTPO with the same composition, and a range of average cell sizes in the foamed rTPO is between 25 to 55 microns.

A method of producing any of the above foamable compositions comprising melting the foamable composition, injecting one or more physical blow agents into the polymer melt at the extruder, and extruding composition through a die. The extrusion step can produce a foamed sheet, strand, tube, container or other extruded article. The density of the foamed rTPO can be up to 80% lower than an unfoamed rTPO with the same composition, and a range of average cell sizes in the foamed rTPO is between 10 to 25 microns.

A method of producing any of the above foamable compositions comprising dry-blending a rTPO and a masterbatch containing at least one nucleating agent, melting the foamable composition, injecting one or more physical blow agents into the polymer melt at the extruder, and extruding composition through a die. The extrusion step can produce a foamed sheet, strand, tube, container or other extruded article. The density of the foamed rTPO can be up to 80% lower than an unfoamed rTPO with the same composition, and a range of average cell sizes in the foamed rTPO is between 10 to 25 microns.

Any of the above methods, wherein the density of the foamed rTPO is about 20 to about 80% lower than an unfoamed rTPO with the same composition. Alternatively, the density of the foamed rTPO is about 50 to about 60% lower than an unfoamed rTPO with the same composition. In yet another alternative, the density of the foamed rTPO is about 50% or about 60%, or about 70% lower than an unfoamed rTPO with the same composition.

Any of the above methods, wherein the range of average cell sizes in the foamed rTPO is about 10 to about 60 microns, about 10 to about 25 microns, or about 25 to about 55 microns or about 45 to about 60 microns.

Any of the above methods, wherein the physical blowing agent added during the extruding step is injected at about 100-3,000 mL/min, or 400-1,500 mL/min, or 500-800 mL/min, or 600 mL/min, or 1,300 mL/min.

An article comprising any of the above foamed compositions. Alternatively, an article produced from any of the above methods.

BRIEF DESCRIPTION OF THE DRAWINGS

FIG. 2 displays exemplary extrusion process conditions for a monolayer foamed sheet formed from presently disclosed novel composition of an rTPO and a masterbatch having an endothermic chemical nucleating and foaming agent.

FIG. 4A displays samples K17101, K17204, K17205, and K17206, prepared using Adflex Q100F. FIG. 4B displays samples K17209 and K17211, prepared using Softell CAO2A. FIG. 4C displays samples K17216 and K17217, prepared using Hiflex CA7600A.

DEFINITIONS

Figure 1:
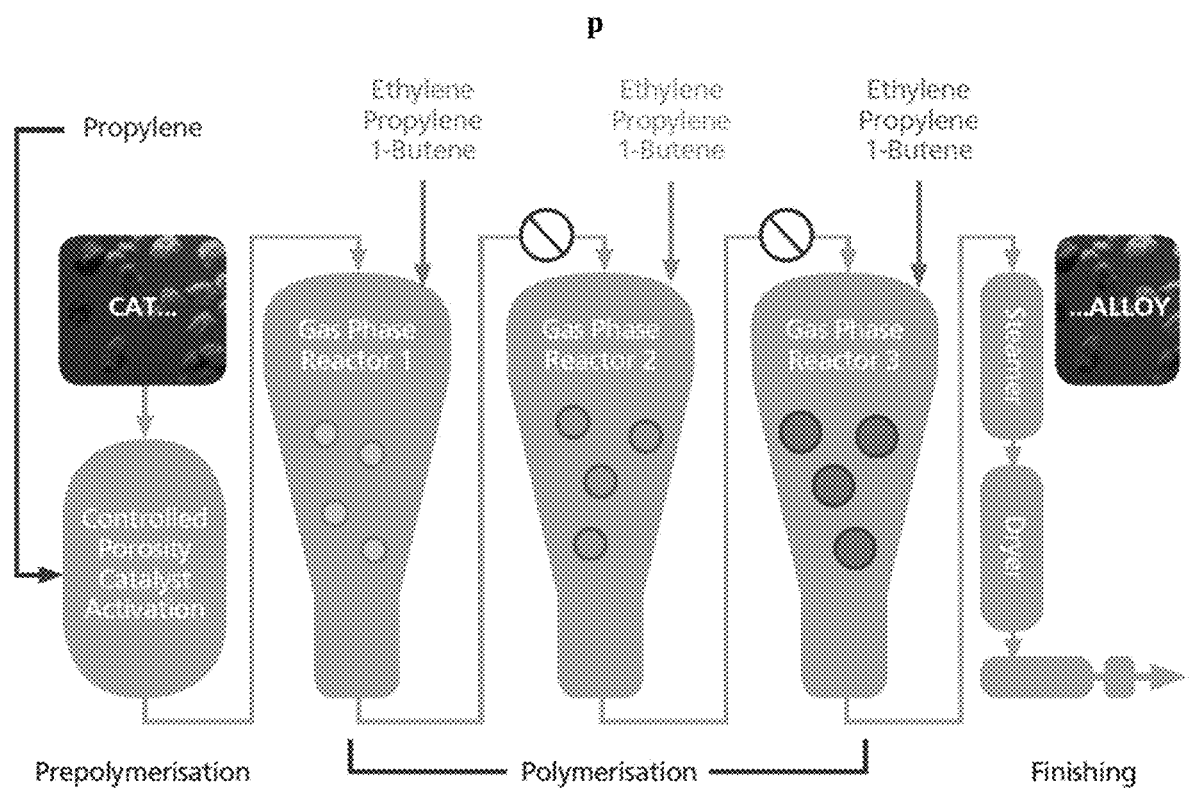
FIG. 1 displays a schematic of the Catalloy process. Image courtesy of LyondellBasell (Houston, Tex.).

As used herein, the term "copolymer" refers to a polyolefin polymer that contains two types of alpha-olefin monomer units.

A "bipolymer" is a specific type of copolymer that has elastomeric properties and a sufficient co-monomer content to create a partially amorphous phase, about >10% comonomer. A bipolymer is one component of the final polymer composition of a PP heterophasic copolymer or a rTPO.

As used herein, the term "heterophasic copolymer" or "heco" refers to a reactor blend of homopolymers and/or copolymers that contains two components: A) a semi-crystalline polypropylene matrix and B) a bipolymer component. The polypropylene matrix may be a homopolymer (HOMO) PP or a random copolymer (RACO) PP of propylene with ethylene or other alpha-olefins. The bipolymer is dispersed within the semi-crystalline polypropylene matrix.

As used herein, the terms "thermoplastic polyolefins" or "TPOs" are used to refer to polyolefins that become pliable or moldable above a specific temperature and solidify upon cooling. The terms "Reactor made thermoplastic polyolefins" or "reactor thermoplastic polyolefins" or "rTPO" are used interchangeably to refer to thermoplastic polyolefins that are made in a reactor system. The present disclosure uses two types of rTPOs for its foamed compositions. The first is a heterophasic copolymer having a semi-crystalline polypropylene matrix with greater than 30% bipolymer content by weight. The second rTPO has a semi-crystalline polypropylene matrix with a polyethylene homopolymer or a polyethylene copolymer with 1-butene or other alpha olefin, and, an elastomeric component consisting of a copolymer of propylene, ethylene, and optionally 1-butene.

As used herein, the term "homopolymer" or "HOMO" refers to a polymer consisting solely or essentially of units derived from a single kind of monomer, e.g., polyethylene homopolymer is a polymer comprised solely or essentially of units derived from ethylene, and polypropylene homopolymer is a polymer comprised solely or essentially of units derived from propylene.

As used herein, the term "α-olefin" or "alpha-olefin" means an olefin of the general formula $CH_2=CH-R$, wherein R is a linear or branched alkyl containing from 1 to 10 carbon atoms. The α-olefin can be selected, for example, from propylene, 1-butene, 1-pentene, 1-hexene, 1-octene, 1-dodecene, and the like.

As used herein, the term "base resin" refers to the rTPO resin that is being foamed by at least one chemical foaming agent or physical blowing agent.

A "foam" is a continuous three-dimensional network or cellular structure of a solid or liquid phase, which surrounds a gaseous phase dispersed therein. In a polymeric foam, such as those presently disclosed, the solid phase is a polymeric resin, which forms the cell walls in the continuous "cellular phase". The "cellular fraction" of the foam is the amount of foam that is in the cells or the gaseous phase.

The terms "chemical foaming agent" and "chemical blowing agent" are used interchangeably to denote chemical compounds that undergo a decomposition reaction during polymer processing that results in the production and release gas. These compounds can be inorganic or organic, and the decomposition can be endothermic (need energy to initiate decomposition) or exothermic (release energy during decomposition). The energy needed to initiate decomposition is can be supplied during processing of the polymer.

In some embodiments, the at least one chemical foaming agent can also act as a nucleating agent, and may be referred to as a "nucleating chemical foaming agent".

"Physical blowing agents" are distinguishable from chemical foaming agents because they undergo a change of state during processing to generate gas. Compressed, liquified gases can be utilized as physical blowing agent, wherein they are injected into a polymer melt under high pressure. As pressure is relieved, the gas becomes less soluble in the melt, resulting in the formation of cells.

As used herein, the term "masterbatch" refers to premixed compositions having one or more solid or liquid additives used to impart other properties to the base resin. The masterbatches used in the present foamed compositions can include at least one chemical foaming agent or at least one nucleating agent or both, as well as include additives that do not interfere with the base resin's ability to foam. As masterbatches are already premixed compositions, their use alleviates issues of insufficient dispersion of the chemical foaming agent(s) and/or nucleating agent(s).

The terms "melt flow rate" and "MFR" are used interchangeably to refer to the measure of the ability of the melt of the base resin to flow under pressure. The melt flow rate can be determined by ISO 1133 ("Plastics—Determination of the melt mass-flow rate (MFR) and melt volume-flow rate (MVR) of thermoplastics") or ASTM D 1238L ("Standard Test Method for Melt Flow Rates of Thermoplastics by Extrusion Plastometer"), both of which measure the melt flow rate at 230° C. and 2.16 Kg of weight. The "melt flow range" is a range of melt flow rates.

The term "intrinsic viscosity" refers to the measure of a solute's contribution to the viscosity of a solution. Here, the solution used is decalin at 135° C., unless otherwise specified. The 'solute' can be the base resin or one of the base resin's individual components or copolymers or bipolymers or the fraction of the base resin that is soluble in xylene at room temperature. Room temperature is approximately 25° C.

All concentrations herein are by weight percent ("wt %") unless otherwise specified.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the presently disclosed compositions and methods.

The following abbreviations are used herein:

| ABBREVIATION | TERM |
|---|---|
| CBA | chemical blowing agent |
| CFA | chemical foaming agent |
| HECO | heterophasic copolymer |
| HOMO | homopolymer |
| MB-A | Masterbatch A |
| MB-B | Masterbatch B |
| MFR | Melt flow rate |
| PBA | physical blowing agent |
| PE | polyethylene |
| PP | polypropylene |
| RACO | Random copolymer |
| rTPO | reactor thermoplastic polyolefin |
| SEM | scanning electron microscopy |
| TPO | thermoplastic polyolefin |
| wt % | Weight percent |

DESCRIPTION OF EMBODIMENTS OF THE DISCLOSURE

The disclosure provides novel foamable compositions of reactor made thermoplastic polyolefin (rTPO) with improved physical properties over currently available foamed polyolefins. The rTPOs have a wide range of rigidity, melt temperatures, and other physical properties, allowing the resulting foams to be available for a broad variety of applications. For instance, certain foamed compositions with more rigid rTPOs can be used in the automotive industry for spare tire packaging, whereas a softer, less rigid rTPOs can be foamed for use as shipping materials or food packaging. Additionally, the foaming agents needed to create the voids in the foams can be selected to elicit certain cell characteristics in the rTPOs, further increasing the breadth of applications. Articles produced from the foamable compositions are also described.

Any propylene-based reactor made thermoplastic polyolefin with a final melt flow rate (MFR) between 0.1 and 35 g/10 min can be foamed per the presently described methods.

In one aspect, the propylene-based rTPO can have: (A) from about 25 to 50%, by weight, of a crystalline propylene homopolymer with a solubility in xylene at room temperature of less than or equal to 4%, or a crystalline copolymer of propylene with ethylene or a $C_4$-$C_8$ alpha-olefin having an ethylene or alpha-olefin content 0.5 to 3%, and a solubility in xylene at room temperature of from less than or equal to 4%; and, (B) from about 50 to 75%, by weight, of a partially amorphous copolymer of ethylene with a $C_4$-$C_8$ alpha-olefin, wherein the alpha-olefin content is from 10 to 20%, and the copolymer is from 10 to 40% soluble in xylene at room temperature.

Alternatively, the propylene-based rTPO can have: (A) can be from 8 to 25% by weight of a crystalline polymer fraction selected from the group consisting of (i) a propylene homopolymer having solubility in xylene at room temperature lower than 10% by weight; and (ii) a copolymer of propylene and at least one alpha-olefin of formula $H_2C=CHR$, where R is H or a $C_2$-$C_6$ linear or branched alkyl, containing at least 85% by weight of propylene, having solubility in xylene at room temperature lower than 15% by weight; and (B) can be from 75 to 92% by weight of an elastomeric fraction comprising (i) a first elastomeric copolymer of propylene with at least one alpha-olefin of formula $H_2C=CHR$, where R is H or a $C_2$-$C_6$ linear or branched alkyl, optionally containing 0.5 to 5% by weight of a diene, the first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and (i) a second elastomeric copolymer of propylene with at least one alpha-olefin of formula $H_2C=CHR$, where R is H or a $C_2$-$C_6$ linear or branched alkyl, optionally containing 0.5 to 5% by weight of a diene, the second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g. The (Bi)/(Bii) weight ratio ranges from 1:5 to 5:1.

In another alternative, the propylene-based rTPO can have: (A) about 30% to less than 70% of a semi-crystalline polypropylene component selected from the group consisting of a propylene homopolymer, a random copolymer of propylene containing up to 8% of ethylene, a random copolymer of propylene containing up to 8% of at least one $C_4$-$C_{10}$ α-olefin, and any combination thereof, wherein the semi-crystalline polypropylene component has a monomodal molecular weight distribution; and, (B) greater than 30% to about 70% of a bipolymer component of propylene and at least one co-monomer selected from ethylene and/or $C_4$-$C_{10}$ α-olefins, wherein the bipolymer itself has from 50%-75% of propylene, wherein the bipolymer is partially soluble in xylene at room temperature and has an intrinsic viscosity of from 4 to 7.5 dl/g (in decalin).

In another alternative, the propylene-based rTPO can have: (A) 10-70% of a copolymer of propylene and one or more co-monomer(s) selected from ethylene and $CH_2=CHR$ alpha-olefins where R is a 2-8 carbon alkyl, wherein the copolymer contains from 0 to 8% of co-monomer(s); and, (B) 30-90% of a copolymer of ethylene and (i) propylene or (ii) $CH_2=CHR$ alpha-olefins, where R is a 2-8 carbon alkyl radical, or (iii) a combination thereof, optionally with minor amounts of a diene, with this copolymer containing from 50% to 80% of ethylene. This propylene-based rTPO can also have an intrinsic viscosity [η] of a fraction soluble in xylene at room temperature (XS) of 1.8 dl/g or more In yet another alternative, the propylene-based rTPO can have: (A) 5-35% by weight of a propylene and ethylene copolymer having 15% by weight or less of a fraction soluble in xylene at 25° C. ($XS_A$) referred to the weight of A, and having from 0.5 wt % to 7.0 wt % of ethylene derived units; (B) 20-50% by weight of an ethylene homopolymer having 5% by weight or less of a fraction soluble in xylene at 25° C. ($XS_B$) referred to the weight of (B); and, (C) 30-60% by weight of a terpolymer, wherein the terpolymer contains propylene, about 45% to 65% by weight of ethylene derived components, and from 15% to 38% by weight of 1-butene derived components, wherein the terpolymer has from 30% to 85% by weight of a fraction soluble in xylene at 25° C. ($XS_C$), the amount of ethylene units; 1-butene units and the fraction $XS_C$ being referred to the weight of (C), wherein the total weight of (A)+(B)+(C) is 100 wt %.

In yet another alternative, the propylene-based rTPO can have: (A) 5-35% by weight of a propylene homopolymer containing 10% by weight or less of a fraction soluble in xylene at 25° C. ($XS_A$), the amount of the fraction $XS_A$ being referred to the weight of A); (B) 20-50% by weight of an ethylene homopolymer having 5% by weight or less of a fraction soluble in xylene at 25° C. ($XS_B$) referred to the weight of (B); and, (C) 30-60% by weight of a terpolymer, wherein the terpolymer contains propylene, about 45% to 65% by weight of ethylene derived components, and from about 15% to 38% by weight of 1-butene derived components, wherein the terpolymer has from about 30% to 85% by weight of a fraction soluble in xylene at 25° C. (XSC), the amount of ethylene units; 1-butene units and the fraction XSC being referred to the weight of (C), wherein the total weight of (A)+(B)+(C) is 100 wt %.

In yet another alternative, the propylene-based rTPO can have: (A) from 60 to 85% of a broad molecular weight distribution propylene polymer having a polydispersity index from 5 to 15 and melt flow rate of from 40 to 75 g/10 min; and (B) from 15 to 40% of a partially xylene-soluble olefin polymer rubber consisting of a poly(ethylene-co-propylene) containing at least 65% by weight of ethylene, wherein the xylene-insoluble content of (B) is 25-40% by weight, measured by dissolving the polymer in xylene at 135° C., cooling the solution to 25° C., allowing to settle for 30 minutes, followed by filtering.

In another aspect, the propylene-based rTPO can have: (A) 5-35% by weight of a propylene-based polymer containing 90 wt % more of propylene units and 10 wt % or less of a fraction soluble in xylene at 25° C.; (B) 25-50% by weight, an ethylene homopolymer containing 5 wt % or less of a fraction soluble in xylene at 25° C., or 25-50 wt % of a copolymer of ethylene and a $C_{3-8}$ alpha-olefin containing from 0.1 wt % to 20 wt % of alpha-olefin units and containing 75 wt % or less of a fraction soluble in xylene at 25° C.; and, (C) 30-60% by weight, of a copolymer of ethylene and propylene containing from 25 wt % to 75 wt % of ethylene units and containing from 55 wt % to 95 wt %, of a fraction soluble in xylene at 25° C. The melt flow rate of this propylene-based rTPO can be between 1.0 and 5.0 g/10 min or between 0.1 and 6 g/10 min.

All of the propylene-based rTPOs described above are exemplary and show the wide variation in the formulations that allows for the broad use of rTPO polyolefin resins and the foamed extrudates in the present disclosure. In addition to the rTPO formulas above, the polyolefins for the current compositions can also include any of the formulas described in US2009015678, US2012184675A, U.S. Pat. Nos. 7,592,393, 8,008,400, EP1025169, EP0640648, EP0472946, EP1687372, WO2016207235, and WO2016207236, each of which is incorporated herein in its entirety for all purposes. The polyolefins can also be prepared by any of the reactor processes described in US2009015678, U.S. Pat. Nos. 7,592,393, 8,008,400, EP1025169, EP0640648, EP0472946, EP1687372, WO2016207235, WO2016207236, and US2012184675A as well.

In yet more embodiments, the rTPO is prepared using a multi-stage gas phase polymerization process. In some embodiments, the multi-stage gas phase polymerization process is the Catalloy process from LyondellBasell (Houston, Tex.). The Catalloy process, shown in FIG. 1, utilizes a unique combination of catalysts, two or three independent fluidized bed reactors, and multiple monomer capability to expand the performance of the resulting polyolefins by delivering new functionalities. The Catalloy process creates an alloy of the bipolymer with the polymer matrix (e.g. semi-crystalline PP backbone) while in the reactors. This allows for the bipolymer to be evenly dispersed throughout the polymer matrix because both are produced simultaneously during the polymerization process. The even dispersion translates to a new combination of softness, flexibility, thermal resistance, haptics, mechanical and impact properties for the resulting rTPOs. The advantages of using the Catalloy-produced rTPOs include the reduced cost associated with producing those materials, ease of processing, ability to make rTPOs with a wide range of polymer compositions, and compatibility with recycle streams. As such, commercially available Catalloy polymers from LyondellBasell (Houston, Tex.) can be used in the present compositions as the base resin for the foams, including Adflex, Hiflex, Hifax and Softell products.

To create a foamed cellular structure using any of the above-described rTPOs, each base resins can be mixed with a chemical foaming agent or a physical blowing agent, and an optional nucleating agent.

The rTPO resins can be combined with at least one chemical foaming agent (CFA). The chemical foaming agents for use with the present disclosure develop gas in the resin by way of thermal decomposition or chemical reactions. In some embodiments, the CFA decomposes during the extrusion process to produce and release a gas into the extruding polymer to foam the resin. To ensure proper dispersion of the CFAs, the CFAs are in a masterbatch that uses a carrier resin that is compatible with at least one polymer or monomer in the polyolefin base resin, such as polyethylene or polypropylene. This allows for the CFAs to create consistent cells morphologies with controlled size distributions throughout the extruded and foamed rTPO.

Many CFAs are known in the art and/or are commercially available. Exemplary organic CFAs include azo and diazo compounds (e.g. azodiacarbonamides), hexahydrophthalic acid and hydrazines, including their salts and anhydrides (e.g. sulfonylhydrazides or triazines), N-nitroso compounds, azides, sulfonyl semicarbazides, triazoles and tetrazoles, urea derivatives, guanidine derivatives, and esters. Exemplary inorganic CFAs include ammonium carbonate, and carbonates of alkali metals, including sodium bicarbonate and citric acid. The CFAs can also include mixtures of acids and metals, mixtures of organic acids with inorganic carbonates, mixtures of nitrites and ammonium salts.

At least one optional nucleating agent may also be combined with the CFA(s). In some embodiments, at least one CFA is present in the same masterbatch comprising the optional nucleating agent, or at least one CFA is present in a separate masterbatch, or at least one CFA acts as the nucleating agent. Nucleating CFAs help with property enhancement, improved molding or extrusion productivity, and increased transparency for many polyolefins. In masterbatches with nucleating agents and multiple CFAs, at least one CFA can be the nucleating agent. Alternatively, any or all of the CFAs used in the present composition can be nucleating. Further, one or more of the CFAs in the masterbatch can be endothermic. Endothermic CFAs need heat to activate the foaming, thus endothermic CFAs do not decompose in the rTPO until the extrusion process, which provides the necessary heat.

In other aspects of the present disclosure, multiple masterbatches can be mixed with the rTPOs to achieve the desired cell morphology of the resulting foam. The final concentration of the masterbatch(es) in the foamed resin may be limited to 5% or 10% of the weight of the foamed resin. Alternatively, the final concentration of the masterbatch(es) in the foamed resin may be between 0.25 and 3 wt %. Alternatively, the final concentration of the masterbatch(es) in the foamed resin may be between 8 and 10 wt %. In yet another alternative, the final concentration of the masterbatch(es) in the foamed resin may be 2.5 wt % or 3 wt % or 5 wt % or 8 wt % or 10 wt %.

The rTPOs have a wide range of physical properties, which lead to flexible formulations when mixed with select CFAs to achieve specific cell size, cell distributions and cell stabilities. This combination allows for the composition to be fine-tuned to form a foam structure with enhanced stability and performance characteristics. Thus, the resulting foams can then have a wide range of physical properties, density reduction, cell size, cell pattern, and/or cell stability. This allows the foams to be available for a variety of applications in the e.g. automobile, shipping, food packaging industries, and others.

The CFAs can be chosen to produce large cell sizes (above 150 microns) or small cell sizes (below 120-150 microns), and a wide or narrow distribution of cell sizes. In some applications, narrow distributions of cell sizes are desirable. In some embodiments, the desired cell sizes are in a range of 25-55 microns, as these foams can be classified as fine-celled foams. However, the desired cell density will depend on the application for the foam. For instance, low cell density foams are more flexible and are better for many applications such as thermal insulation and comfort (e.g. furniture and car seating) but high cell density can be used for more rigid foams, such as energy-absorbing applications, pipes, appliances, food and drink containers. Since the mechanical strength of a polymer foam is proportional to the foam density, the application of the foam dictates the range of foam density to be produced.

In addition to cell size and density, the CFAs can be chosen to achieve certain flexibility in the resulting foamed extrudate.

Alternatively, the rTPO base resin, in melt form, can be combined with a physical blowing agent such as $CO_2$, $N_2$, isobutane, or CFC-derivatives, and foamed. The process conditions for the blowing agents are controlled to tune the cellular phase, cell size, and other cell features of the resulting foam.

When using PBAs, the rTPO base resin can also optionally be combined with a masterbatch having at least one nucleating agent. The PBA and the nucleating agent work synergistically to achieve desired cell morphology, including both large cell sizes (above 150 microns) or small cell sizes (below 120-150 microns), and a wide or narrow distribution of cell sizes. As above, the final concentration of the masterbatch in the foamed resin may be limited to 5% or 10% of the weight of the foamed resin. Alternatively, the final concentration of the masterbatch in the foamed resin may be between 0.25 and 3 wt % or between 8 and 10 wt %. In yet another alternative, the final concentration of the masterbatch(es) in the foamed resin may be 2.5 wt % or 3 wt % or 5 wt % or 8 wt % or 10 wt %.

Articles of various shapes and sizes can be formed using foamed compositions comprising any of the propylene-based rTPO base resins presently disclosed.

The presently disclosed compositions are exemplified with respect to the disclosure below. However, these examples are exemplary only, and the invention can be broadly applied to any rTPOs base resin, and chemical foaming agent or physical blowing agents.

The following description demonstrates various embodiments, and is intended to be illustrative, and not unduly limit the scope of the appended claims. Those of skill in the art should appreciate that many changes can be made in the specific embodiments which are disclosed and still obtain a like or similar result without departing from the spirit and scope of the disclosure herein. In no way should the following be read to limit, or to define, the scope of the appended claims.

Base polymer: A series of commercially available Catalloy rTPO resins from LyondellBasell, (Houston, Tex.) were extruded with a foaming agent, foamed, and analyzed per the methods described below. The examples utilized commercially available resins from the Adflex, Softell, Hifax and Hiflex product lines. These rTPOs provide a broad scope of softness, impact strength, temperature resistance, and flexibility for use in making the articles and used in the proposed methods.

Chemical foaming agents: A series of commercially available masterbatches containing at least one chemical foaming agent may be combined with a rTPO. Masterbatch A (MB-A) contains an endothermic chemical nucleating and foaming agent that was used in a concentration of 1.5-2.25 wt %. The CFA in MB-A is also used for the creation of cells to reduce density and improve throughput in medium density extrudate. Masterbatch B (MB-B) contains an olefinic nucleating agent that was used in a concentration of 0.75-1.0 wt %. The CFA in MB-B is used to improve cell dispersion, size and uniformity in extrusion processes producing chemical foam. Masterbatch C contains an endothermic/exothermic blended chemical foaming agent in a concentration of 1 wt %. The CFA in this masterbatch is used for both injection molding and extrusion applications to create cells in medium density extrudate. Masterbatch D contains a chemical foaming agent at a concentration of 2.5 wt %. Masterbatch E contains a nucleating agent used at a concentration of 1 wt % and was combined with one of the other masterbatches having a CFA.

A masterbatch with at least one CFA was mixed with the resins before being extruded and foamed. The use of one nucleating chemical foaming agent may be sufficient to foam the chosen base polymers, but mixes of chemical foaming agents can be used to fine-tune the characteristics of the foamed extrudate.

Unless otherwise noted, the selected masterbatches were dry blended with the base resin before the melt stage.

CFA Foam Extrusion: A variety of sample compositions with CFAs were prepared and extruded as foamed strands. The base polymer and masterbatches were dry blended and extruded without modifications to the extrusion equipment or the resin grade. The foam strand samples were then analyzed for cellular phase, cell size, and other cell features.

From the characterization results of the foam strands, sample compositions with CFAs were extruded as sheets. For the sheets, the base polymer and masterbatches were dry blended and extruded as monolayer (Mode 1) or multi-layer sheets (Mode 2) to produce foamed sheets that were about 40 mil (about 1 mm) thick. Certain foam sheet samples underwent further analysis for density, density reduction compared to the base polymer alone, cell size, and other cell features.

No modifications to the extrusion equipment or the resin grade were needed to produce the sample foamed sheets. FIG. 2 displays exemplary process conditions for the extrusion of a foamed sheet, in this case a monolayer foamed sheet sample using Masterbatch A. These conditions did not vary much for the different foamed sheets. The dashed box in FIG. 2 highlights Barrel Zone 2, which uses a higher temperature than Barrel Zones 1 and 3, to activate the chemical foaming agent.

Physical blowing agents: A series of the commercially available Adflex resins were foamed using nitrogen as a physical blowing agent (PBA). The use of one nucleating agent in the resin aided the ability of the physical blowing agents to foam the resin. Like the CFAs, a commercially available masterbatch was used to disperse the nucleating agent. For these samples, a commercially available masterbatch, referred to as Masterbatch F, was dry blended with the resin at a concentration of 1% wt of the final resin before injection of the physical blowing agent. Masterbatch F is a nucleating agent that relies on a sodium carbonate and citric acid system.

Nitrogen was used as the physical blowing agent and was injected into the polymer melt at the extruder at a rate of injection of either 600 mL/min or 1,300 mL/min. The foamed polymers were then extruded as sheets with a target thickness of about 40 mil (about 1 mm) without modifications to the extrusion equipment or the resin grade, unless otherwise noted. The foam sheet samples were then analyzed for cellular phase, cell size, and other cell features.

Foam Characterization: Morphological characterization of the cellular structure of the foamed Catalloy extrudates were determined by optical microscopy and scanning electron microscopy (SEM). Foam samples were cryo-microtomed in the direction perpendicular to extrusion using a Leica MZ6 Ultramicrotome with a diamond knife at −40° C. The thin cross-sections were examined by optical microscopy (Olympus BX51 Compound Microscope) with both transmitted light and cross-polarized light. The bulk cross-sections were examined using an SEM (Hitachi S-3500N or SU8230) in high vacuum mode at accelerating voltage of 5 kV. SEM images were captured at the same low magnification (25×) to allow for the whole extrudate cross-section of each sample to be included in a single image. Prior to SEM imaging, the bulk cross-section specimens were coated with Pt using a sputter coater (Emitech K550X) to eliminate charging from SEM electron beam.

Olympus Stream Essentials image software was employed to perform image analysis on SEM images where the cells displayed as dark holes are dispersed in the lighter polymer matrix. For this type of cellular morphology, the particle analysis function of the software is the most suitable means to measure the size and number of cells in each foam cross-section. To ensure accurate results, prior to image analysis, each SEM image was examined and manually corrected using Adobe Photoshop software to enhance the contrast between the cells and the solid phase. The gray value thresholds that distinguish cells from the solid phase in image analysis were adjusted based on each individual image so that the most cells were counted. To ensure consistency, no further manual editing of image detection was conducted after automatic image analysis by Stream Essentials software. The average cell size or radius, cumulative cell area distribution, and morphology of the cells (open or closed) were determined from the images.

Density measurements were made according to the standard test methods established in ASTM D792-13 using displacement by water or alcohol. The reduction in density was calculated based on the density of the base polymer for each example without any foaming agents added.

CFA Foamed Strands

Foamed strands were prepared with various Adflex rTPOs using CFAs, and analyzed for the largest reduction in density compared to the unfoamed resin and the smallest cell size. The compositions and results for the preliminary samples are shown in Table 1.

TABLE 1

Preliminary compositions for foamed strands

| EXAMPLES | DENSITY OF FOAM (g/cm$^3$) | NOMINAL CELL SIZE (microns) | DENSITY of SOLID rTPO (g/cm$^3$) | REDUCTION PERCENT |
|---|---|---|---|---|
| rTPO | | | | |
| Adflex Q100F, 2% Masterbatch A[+] | 0.55 | 115 | 0.88 | 38% |
| Adflex Q100F, 1.5% Masterbatch A | 0.60 | 225 | 0.88 | 32% |
| Adflex Q100F, 1.5% Masterbatch A, 1% Masterbatch B[+] | 0.52 | 170 | 0.88 | 41% |
| Adflex Q100F, 1.5% Masterbatch A, 1% Masterbatch E | 0.62 | 230 | 0.88 | 30% |
| Adflex Q100F, 1% Masterbatch C | 0.43 | 295 | 0.88 | 51% |
| Adflex Q100F, 1% Masterbatch C, 1% Masterbatch B | 0.46 | 270 | 0.88 | 48% |
| Adflex Q200F, 2% Masterbatch A[+] | 0.44 | 140 | 0.88 | 50% |
| Adflex Q200F, 2% Masterbatch A, 1% Masterbatch B[+] | 0.46 | 145 | 0.88 | 48% |
| Adflex Q200F, 1% Masterbatch A, 1% Masterbatch B | 0.60 | 140 | 0.88 | 32% |
| Adflex Q200F, 1% Masterbatch C | 0.53 | 260 | 0.88 | 40% |
| Adflex Q200F, 1% Masterbatch C, 1% Masterbatch E | 0.52 | 300 | 0.88 | 41% |
| Adflex Q200F, 2.5% Masterbatch D | 0.74 | 90 | 0.88 | 16% |
| Adflex KS021P, 2% Masterbatch A[+] | 0.52 | 165 | 0.88 | 41% |
| Adflex KS021P, 1.5% Masterbatch A | 0.70 | 160 | 0.88 | 20% |
| Adflex KS021P, 1.5% Masterbatch A, 1% Masterbatch B[+] | 0.64 | 130 | 0.88 | 27% |
| Adflex KS021P, 1.5% Masterbatch A, 1% Masterbatch E | 0.71 | 160 | 0.88 | 19% |
| Adflex KS021P, 1% Masterbatch A, 1% Masterbatch B | 0.78 | 120 | 0.88 | 11% |
| Adflex KS021P, 1% Masterbatch C, | 0.50 | 310 | 0.88 | 43% |
| Adflex KS021P, 1% Masterbatch C, 1% Masterbatch E | 0.54 | 220 | 0.88 | 39% |
| Adflex X500F, 2% Masterbatch A | 0.67 | 340 | 0.89 | 25% |
| Adflex X500F, 2.5% Masterbatch A | 0.54 | 290 | 0.89 | 39% |
| Adflex X500F, 2% Masterbatch A, 1% Masterbatch B | 0.44 | 310 | 0.89 | 51% |
| Adflex X101H, 1% Masterbatch A, 1% Masterbatch B* | 0.64 | 185 | 0.88 | 27% |

*Unable to maintain strand integrity
[+]Samples chosen for additional characterization Six samples shown in Table 1 were chosen for additional characterization, including image analysis. These samples were Adflex Q100F with 1.5% Masterbatch A and 1% Masterbatch B (Sample No. 5150); Adflex Q200F with 2% Masterbatch A and 1% Masterbatch B (Sample No. 5151); Adflex Q200F with 2% Masterbatch A (Sample No. 5152); Adflex Q100F with 2% Masterbatch A (Sample No. 5153); Adflex KS021P with 1.5% Masterbatch A and 1% Masterbatch B (Sample No. 5154); and, Adflex KS021P with 2% Masterbatch A (Sample No. 5155). The results for the addition analysis are shown in Table 2.

TABLE 2

Characterization of select foamed strands

| Foam Strand Sample No. | rTPO | MB-A (wt %) | MB-B (wt %) | Cellular Phase (µm$^2$) | Fraction of Cellular Phase (%) | Cell Count | Average Cell Diameter (µm) | Average Cell area (µm$^2$) | Relative Standard Deviation (%) | Strand Diameter (µm) |
|---|---|---|---|---|---|---|---|---|---|---|
| 5150 | Adflex Q100F | 1.5 | 1 | 2768671.80 | 42.32 | 270 | 114.26 | 10254.34 | 233.57 | 2886.00 |
| 5151 | Adflex Q200F | 2 | 1 | 2697767.56 | 42.78 | 292 | 108.46 | 9238.93 | 166.84 | 2833.73 |
| 5152 | Adflex Q200F | 2 | | 3092916.88 | 39.83 | 472 | 91.34 | 6552.79 | 140.66 | 3144.44 |
| 5153 | Adflex Q100F | 2 | | 2463764.10 | 34.65 | 510 | 78.43 | 4830.91 | 189.73 | 3008.83 |
| 5154 | Adflex KS021P | 1.5 | 1 | 1163704.32 | 21.68 | 184 | 89.74 | 6324.48 | 110.75 | 2614.50 |
| 5155 | Adflex KS021P | 2 | | 2006520.93 | 26.27 | 313 | 90.35 | 6410.61 | 142.87 | 3118.42 |

From the image analysis, the selected extruded strands in Table 2 were found to have circular cross-sections, with diameter measurements ranging from 2.6 to 3.2 mm. These foamed compositions show slight variations in rigidity and size, reflecting different chemical compositions and levels of foam expansion.

All of the optical images were taken with the lowest possible magnifications from the microscope so the largest areas of the foam cross-sections can be included. The cellular morphology varied from strand sample to strand sample. In general, the cell sizes were smaller near the strand surface where the polymer melts experience the higher shear forces during processing. The sizes of the cells gradually increase with the distance from the surface. Near the core, many small cells appeared to aggregate to form a large cell of an irregular shape due to the low shear force of the polymer melt, making it incapable of dispersing individual cells during either the initial bubble formation, or due to the high extensional force of the melt causing the cell rupture during cell growth. In some samples, the observed larger cells may be a result of the disappearance of cell walls that separate individual cells. However, cell walls tend to collapse because they are too thin to withstand low temperature microtoming that is used to prepare the samples for analysis.

SEM was used to confirm the variations of cell sizes with the distance from the strand surface and to observe the cell aggregations. Some of the aggregates formed clusters of cells with the existence of solid walls between neighboring cells. Others formed larger cell aggregates of irregular shapes. Many of the cells in the foam strand samples were non-spherical. A foaming polymer melt tends to be stable when the gas bubbles were strictly spherical in shape to minimize the interfacial area and the capillary pressure; however the bubbles become elongated in the extrusion direction, resulting in the non-uniform distribution of the mechanical stresses during foaming. The gas bubbles would tend to expand along the directions of minimum local stress to produce the anisotropic shapes of cells. In addition, the degree of freedom is higher in the extrusion direction during foaming because it has less geometric constraints.

The SEM images did not show the enclosure of these hemispherical cells. Although SEM images can show individual cells within the large cell aggregates that are connected to each other, there is no morphological evidence to characterize any of these foam samples as open-cell foam in overall view.

Cells were not uniformly dispersed in the solid polymer. For this type of foam, cell size analysis provides comprehensive and valuable characteristics of foam structures to differentiate various foam samples. Some morphological parameters, such as wall thickness and cell packing geometry, were not measurable or meaningful.

Table 2 lists results of cell counts, average cell sizes, and relative standard deviations obtained by Stream Essentials image software through particle analysis. The sizes of cellular phase and area fractions of cellular phase were calculated based on these results and measured strand diameters. The cell phase area fractions for these samples are below 50%.

The single CFA formulation (2.0% Masterbatch A) was more effective for Adflex KS021P which produced 26.27% cellular area fraction, whereas the two-agent formulation (1.5% Masterbatch A and 1% Masterbatch B) produced a lower level at 21.68% of cellular area fraction. The opposite was shown for Adflex Q200F, where the two-agent formulation (2% Masterbatch A and 1% Masterbatch B) resulted in a larger cellular area fraction (39.83% v. 42.78%). These results illustrate the fine-tuning of the type and concentration of foaming agents in the foamed composition to elicit desired properties from each base resin.

As shown in Table 2, the average cell sizes for foam strand samples produced in these samples are within the range of about 70 to 115 µm of the equivalent diameter, thus they are classified as small-celled foams.

Figure 3A:
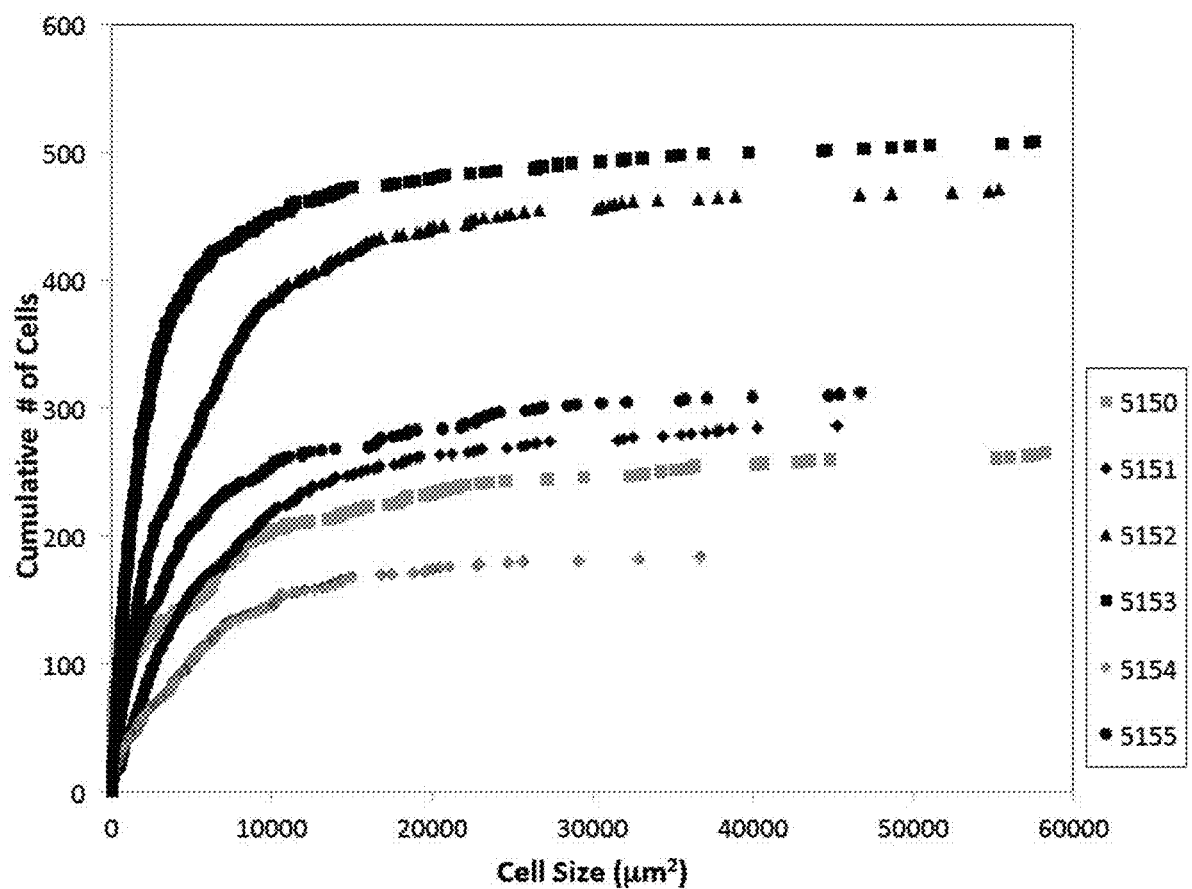
FIG. 3A displays the cell size distribution for foam strands samples listed in Table 2 and FIG. 3B is a histogram of cell size distributions for foam strands samples listed in Table 2.
Figure 3B:
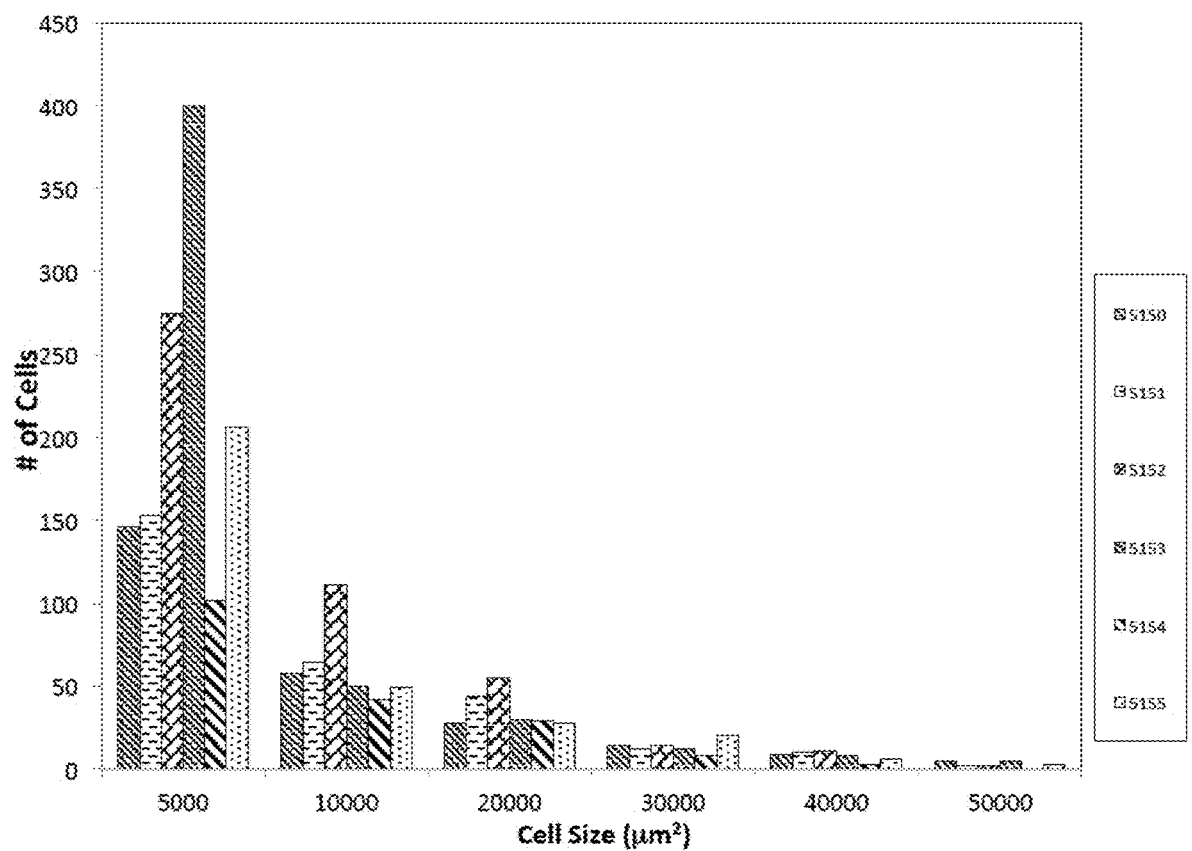

The results of cell size measurements were further analyzed for size distribution. As displayed in FIG. 3A (cumulative number of cells vs. cell radius) and FIG. 3B (cell size histograms), and also shown in Table 2, these foam strand samples are not symmetric. The curves in FIG. 3A indicate that the resin type is the source of major differences in cell formation. The range of variations within each pair of foams produced from the same resin was relatively broad. The cell dimension detected most frequently in each foam sample is in the smallest particle size range. This type of particle size distribution results in a relatively high standard deviation in cell size measurements.

In conclusion, the base resins used in the strand samples were able to foam. This was unexpected as the rTPO base resins have several characteristics that indicate they would not be suitable for foaming: a bipolymer component with a xylene soluble intrinsic viscosity between 2 and 5 dL/g, a monomodal matrix component, and a bipolymer component greater than 50% by weight. However, the compositions disclosed are capable of producing foamed strands. Further, the selected foamed strands compositions were small-celled foams that had smaller cells seen near the surface while larger cells of irregular shapes are located near the core. It is generally known in the art that small cell structures tend to have a smaller negative impact on mechanical properties than large cell structures. The density reductions were up to 60% when compared to the base resin.

These results show that not only are the Catalloy rTPOs capable of being foamed regardless of their xylene soluble intrinsic viscosity, matrix modality, and bipolymer content but that the character of the foams (e.g. cell size, density reduction, etc.) can be tuned by the choice of chemical foaming agent(s) and/or the addition of one or more nucleating agents. Further, due to the breadth of possible applications for foamed polyolefins, perceived "imperfections" for certain applications, such as the foamed strands with inconsistent cells sizes, can find many uses.

CFA Foamed Sheets

Based in part on the results from the foamed strand tests, the following Catalloy grades were used to prepare CFA foamed sheets: Adflex Q100F, Softell CAO2A, and Hiflex CA7600A. The compositions were foamed as either single layer sheets (mode 1) or as multi-layered sheets (mode 2). Like the foamed strands, Masterbatch A and Masterbatch B were utilized for the CFA foamed sheets. The foam sheets were produced by dry-blending a combination of Masterbatch A and Masterbatch B with the selected base Catalloy resin, and extruding with an 8-inch flat die to prepare foam sheets with a target thickness of 40 mil (about 1 mm).

Figure 4A:
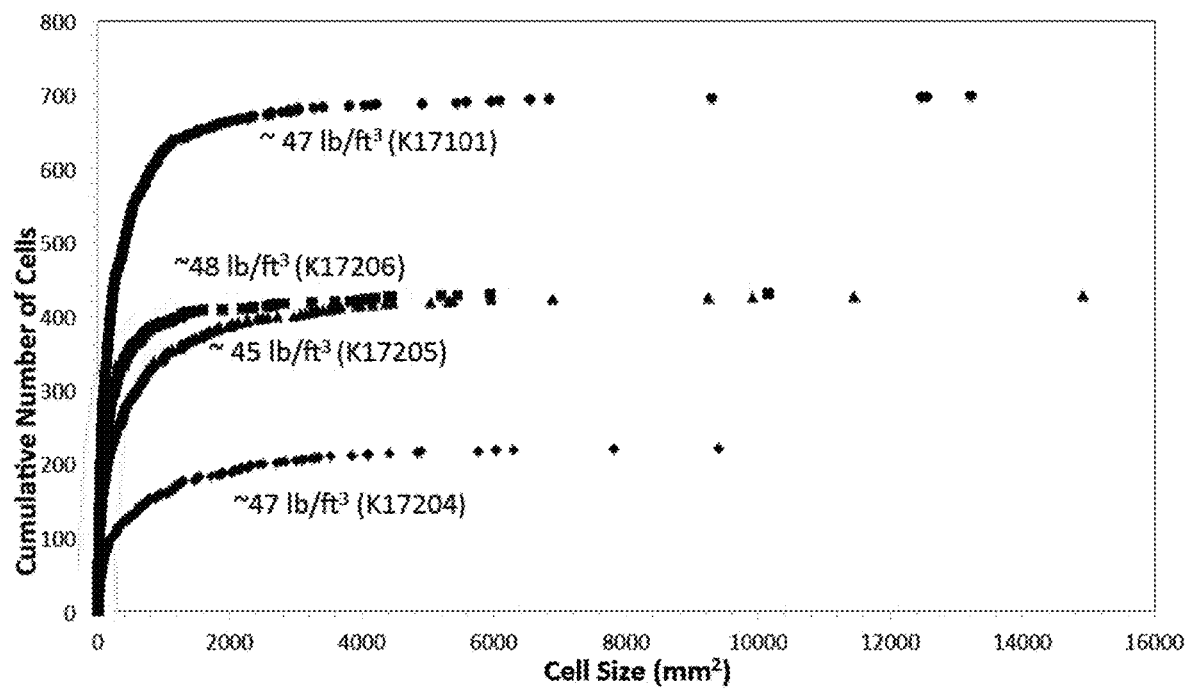
FIG. 4A-C displays the average cell size distribution for foam multi-layer sheet samples prepared using CFAs and rTPOs that are commercially available from LyondellBasell (Houston, Tex.).
Figure 4B:
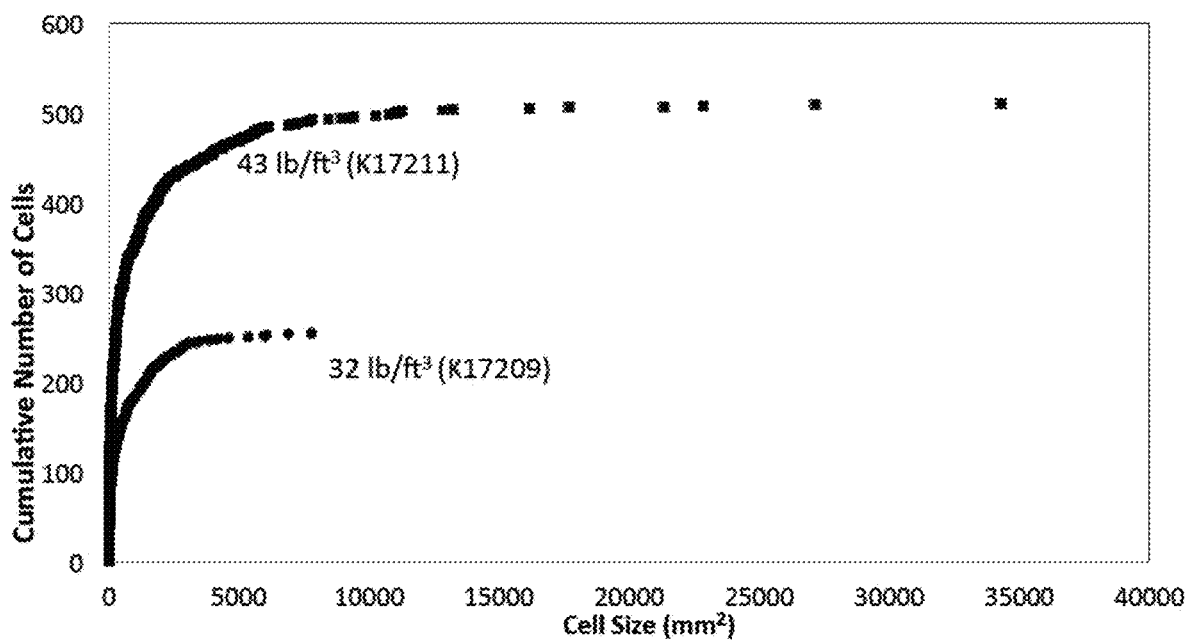
Figure 4C:
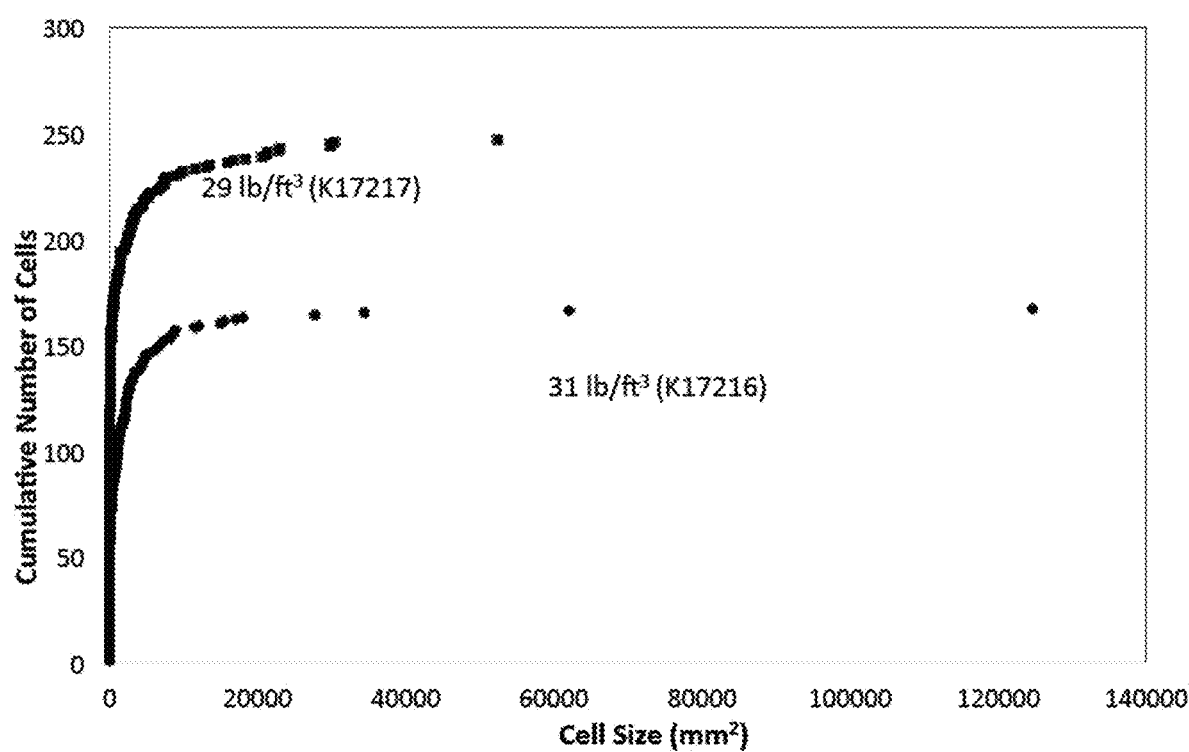

The compositions of each CFA foamed sheet and the results of the ASTM D792 testing are shown in Table 3. FIGS. 4A-C displays the cumulative cell area distribution for the each composition, with the density labeled. Results specific to each Catalloy rTPO are also discussed below.

TABLE 3

Exemplary foamed sheets

| Sample. No. | MB-A (wt %) | MB-B (wt %) | Mode | Density (g/cm³) | Density reduction (%) | Density (lb/ft³) | Average Cell radius (microns) |
|---|---|---|---|---|---|---|---|
| Adflex Q 100 F | | | | | | | |
| Unfoamed Control | 0 | 0 | — | 0.880 | — | 55 | — |
| K17101 | 1.5 | 0 | 1 | 0.743 | 16 | 46.4 | 25 |
| K17204 | 1.5 | 0 | 2 | 0.747 | 15 | 46.6 | 34 |
| K17205 | 1.5 | 0.75 | 2 | 0.718 | 18 | 44.8 | 30 |
| K17206 | 1.75 | 0.75 | 2 | 0.767 | 13 | 47.9 | 23 |
| Softell CA02A | | | | | | | |
| Unfoamed Control | 0 | 0 | — | 0.880 | — | 55 | — |
| K17209 | 1.5 | 0 | 2 | 0.5049 | 43 | 31.5 | 22 |
| K17211 | 1.5 | 0.75 | 2 | 0.7737 | 12 | 48.3 | 16 |
| Hiflex CA7600A | | | | | | | |
| Unfoamed Control | 0 | 0 | — | 0.880 | — | 55 | — |
| K17216 | 1.75 | 0 | 2 | 0.5033 | 43 | 31.4 | 33 |
| K17217 | 1.75 | 0.75 | 2 | 0.4581 | 48 | 28.6 | 27 |

Adflex Q100F-based foams. Sample No. K17101 produced foam with a density of 46.4 lb/ft³, a 16% reduction. Sample No. K17204 used the same concentration of Masterbatch A as in K17101 and had a comparable density reduction of 15%. The average cell radius for K17204 was 34 microns, whereas Sample No. K17101 attained an average cell radius of 25 microns.

Adding 0.75 wt % of Masterbatch B to Sample No. K17205 decreased density by 18%, to 44.8 lb/ft³. Further increases in Masterbatch A concentration (Sample No. K17206) did not result in a decrease in density. The average cell radius for K17206 was the lowest of all runs for this grade, at 23 microns.

Comparison of the curves in FIG. 4A shows that Sample No. K17101 had the most uniform structure from all four, while Sample No. K17204 had the least uniform structure. Sample Nos. K17205 and K17206 are in-between. A straight vertical line indicates a single cell size throughout the foam. Sample No. K17101 is the closest to a vertical line.

Softell CAO2A-based foams. Softell polymers are flexible and have a xylene soluble intrinsic viscosity less than 5 dL/g, a monomodal matrix, and a bipolymer component greater than 50% by weight, suggesting that they would be poor choices for foaming. Unexpectedly, both Softell exemplary compositions produced foams with uniform structures. Sample No. K17209 produced foam with a density of 31.5 lb/ft³, a 43% reduction. Sample No. K17211 used the same concentration of Masterbatch A but an added 0;75 wt % of Masterbatch B. This resulted in a foam that had a much lower density reduction of 12%.

Sample No. K17211 had a more comparable average cell size however. Sample No. K17209 had an average cell radius 22 microns while Sample No. K17211 attained an average cell radius of 16 microns. FIG. 4B shows that Sample No. K17211 had a more uniform structure, too.

Hiflex CA7600A-based foams. Sample No. K17216 produced foam with a density of 31.4 lb/ft3, a 43% reduction. Sample No. K17217 used the same concentration of Masterbatch A but added 0.75 wt % of Masterbatch B. Its density reduction was slightly higher at 48%. The average cell size for K17216 was 33 microns while Sample No. K17217 attained an average cell radius of 27 microns. FIG. 4D shows that Sample No. K17217 had a more uniform structure as well.

The system hardware was not optimized for foam production. However, foams with densities around 30-40 lb/ft3 were produced without have to make any modifications to the system. The chemical foaming agents were able to reduce the density for each of the tested rTPO base resins. A reduction of up to about 49%, was shown with these foamed sheet samples. The unexpectedly large density reduction was most likely achieved due to the presence of a high percentage of a high molecular weight bipolymer in Adflex Q100F, Softell CAO2A, and Hiflex CA7600A. The presence of high molecular weight bipolymer at a meaningful concentration (greater than 45%, preferably greater than 50%) may result in a high concentration of molecular entanglements that in turn increase melt strength. The higher the melt strength, the better the observed foaming behavior.

Similar to the results from the foam strands, resins that were not expected to foam because of low xylene soluble intrinsic viscosity, monomodal matrix component, high percentage of bipolymer component, did form foams.

The cell radii were also reduced down to about 25-55 microns, thus these foams can be classified as small-celled foams. Further, each sample was predominantly closed-cell foams as the foam cells are isolated from each other and cells are surrounded by complete cell walls, and this desirable feature is helpful in selecting applications for the foamed compositions. The foam samples also showed variations of cell size and shape with the distance from the foam surface. Smaller cells were seen near the surface while larger cells of irregular shapes are located near the core, suggesting that the foam structure depends strongly on the rheological behavior of the rTPO and the equipment used for foaming.

The composition of the foaming agents did not affect each rTPO base resin in the same way. The Hiflex CA7600A samples had the highest cell count and the smallest average cell size but were also affected the most by the change of the chemical foaming agent formulation.

The foaming agent(s) affected the number of cells and range of cell sizes. FIG. 4A displays the cumulative cell area distribution for the Adflex Q100F samples, with the density labeled. As shown, Sample No. K17101 used Masterbatch A as a foaming agent and had the largest cumulative number of cells per cell size, whereas the same composition for Sample No. K17204, in a multi-layer sheet format, has a much smaller cumulative number of cells per cell size. See also FIGS. 4B-C for Softell CAO2A and Hiflex CA7600A, each showing that the rTPO reacts differently to the foaming agent, in terms of trends for the number of cells and range of cell size.

Figure 5:
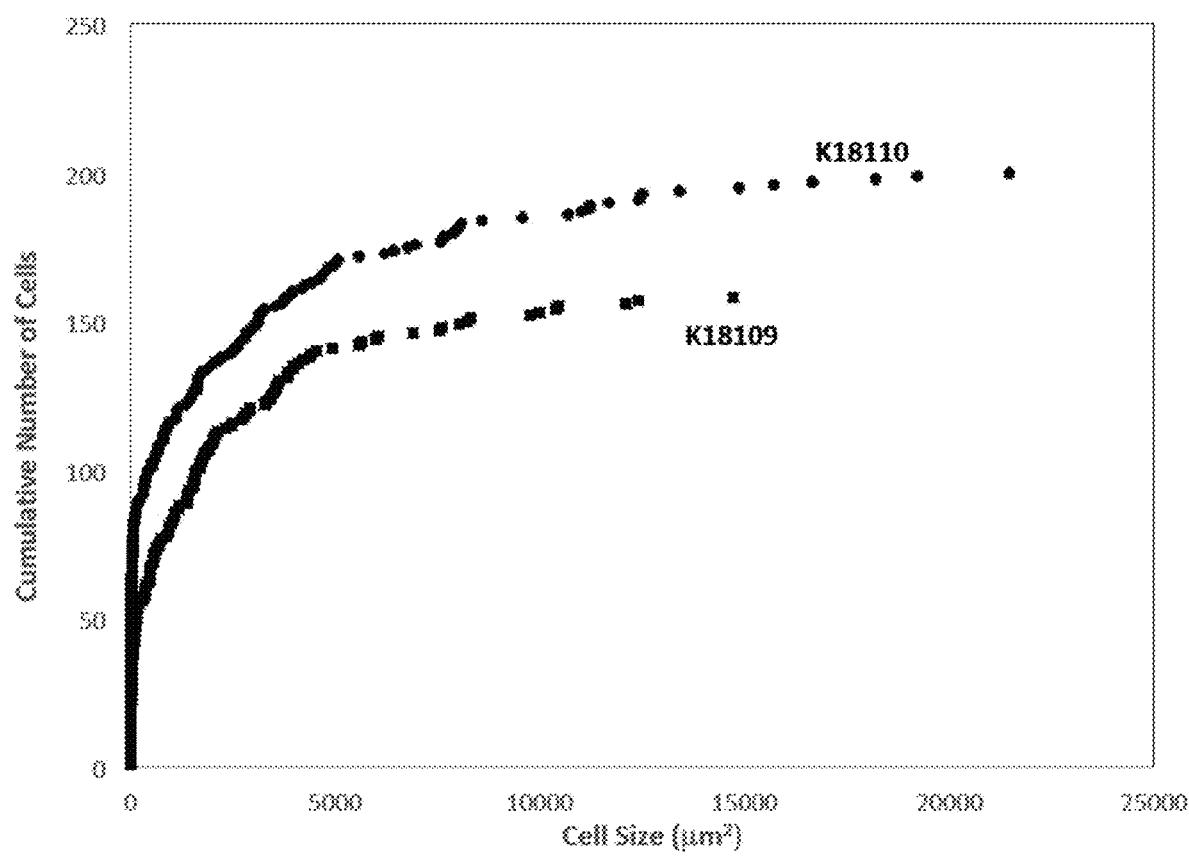
FIG. 5 displays the average cell size distribution for foamed monolayer sheet samples K18109 and K18110, prepared using Softell CA7469A and at least one CFA. Softell CA7469A is a commercially available product from LyondellBasell (Houston, Tex.).

Additional monolayer sheets were foamed for Softell CA7469A samples, with the results being shown in Table 4 and FIG. 5.

TABLE 4

Exemplary Softell foamed sheets

| Sample No. | MB-A (wt %) | MB-B (wt %) | Mode | Foam Density (g/cm³) | Solid Density (g/cc) | Density reduction (%) | Density (lb/ft³) | Average Cell Diameter (microns) |
|---|---|---|---|---|---|---|---|---|
| Softell CA7469A | | | | | | | | |
| Unfoamed Control | | | | | 0.88 | | 55 | |
| K18109 | 1.5 | 0 | 1 | — | 0.88 | 26 | 41 | 50 |
| K18110 | 1.5 | 0.75 | 1 | — | 0.88 | 29 | 39 | 46 |

As explained above, Softell CA7469A has a low xylene soluble intrinsic viscosity, a monomodal matrix component, a high percentage of bipolymer component, a bipolymer component containing greater than 50% ethylene comonomer, and high flexibility. As such, this rTPO base resin was expected to be a poor choice for foaming. However, this rTPO was mixed with varying combinations of masterbatches and foamed as monolayer sheets.

As before, SEM was used to confirm the variations of cell sizes with the distance from the monolayer surface of the exemplary sheets in Table 4, and to observe the cell aggregations. Some of the aggregates formed clusters of cells with the existence of solid walls between neighboring cells. Others formed larger cell aggregates of irregular shapes. Many of the cells in the foam monolayer samples were non-spherical due to becoming elongated during the extrusion process.

Sample Nos. K18109 and K18110 show density reductions between 25% and 30% and average cell diameters between 45 and 50 microns, indicative of small-celled foams.

PBA Foamed Sheets

Foamed sheets with a 40 mil (about 1 mm) thickness were prepared using nitrogen as a physical blowing agent and an optional masterbatch with a nucleating agent. The foamed sheets were produced by injecting $N_2$ at 600 mL/min or 1,300 mL/min at the extruder. As mentioned above, Masterbatch F at a concentration of 1 wt % of the final foamed composition was dry blended with the base resin for use as a nucleating agent.

Figure 6:
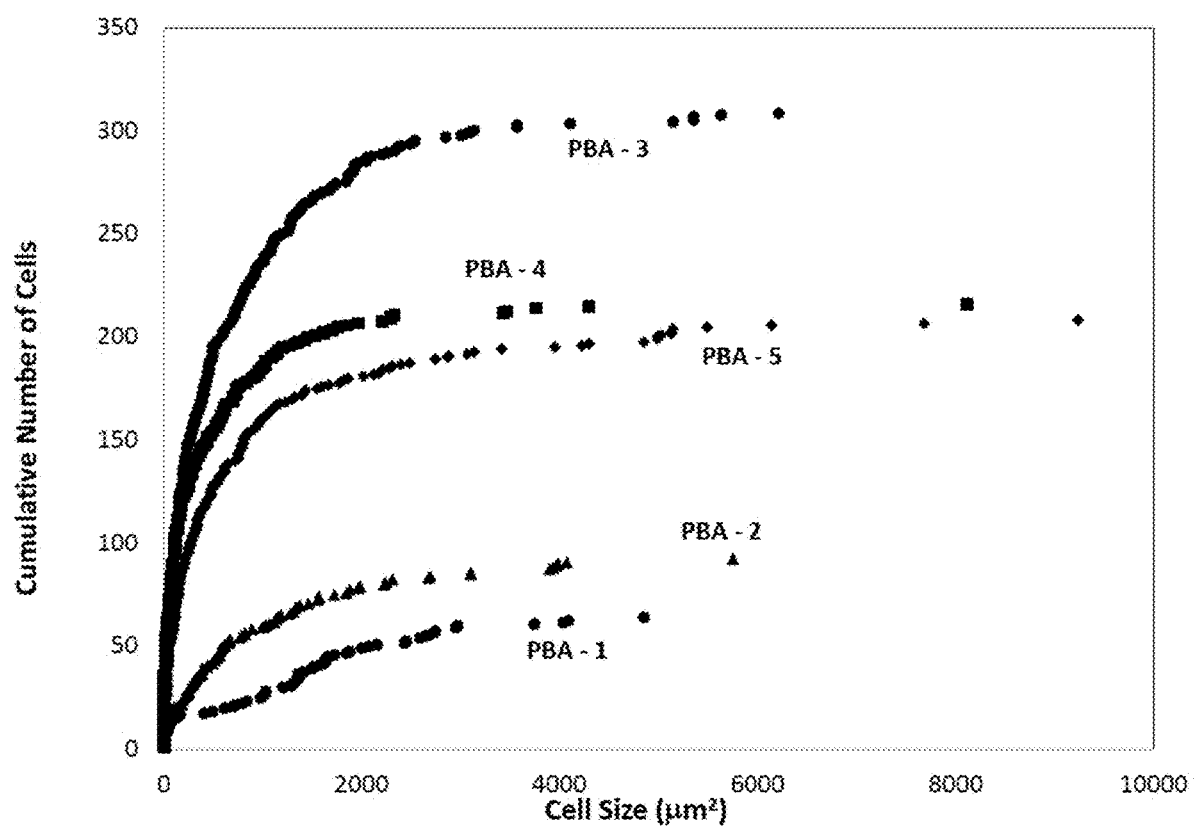
FIG. 6 displays the average cell size distribution for foam sheet samples listed in Table 5. These samples were prepared using commercially available Adflex rTPOs from LyondellBasell (Houston, Tex.) and N2 as a PBA.

The resulting foams were characterized to determine density reduction and determination of average cell size, with the results displayed in Table 5 and FIG. 6. The foams were also examined using SEM and optical microscopy.

TABLE 5

Density Reduction and Average Cell Size

| Sample No. | rTPO | $N_2$ (mL/min) | Solid Density (g/cc) | Foam Density (g/cm³) | Density reduction (%) | Foam Density (lb/ft³) | Average Cell radius (microns) |
|---|---|---|---|---|---|---|---|
| PBA - 1 | Adflex X101H | 600 | 0.88 | 0.7042 | 20 | 44 | 21 |
| PBA - 2 | Adflex KS021P | 600 | 0.88 | 0.7284 | 17 | 45 | 18 |
| PBA - 3 | Adflex Q100F | 600 | 0.88 | 0.6387 | 27 | 40 | 15 |
| PBA - 4 | Adflex Q200F-600 | 600 | 0.88 | 0.6809 | 23 | 43 | 12 |
| PBA - 5 | Adflex Q200F-1300 | 1300 | 0.88 | 0.6394 | 27 | 40 | 17 |

The density reductions range between 17% and 27%, and the densities are all around 40 lb/ft$^3$, which reflects the modest density reduction numbers. The average cell radius varies between 12 and 21 microns, meaning these are very small celled foams. As such, all of the foams produced by the physical blowing agent would classify as medium-to-high density foams (Low=<0.3 g/cm3, High>0.6 g/cm3).

A few differences were observed with PBA-1. Producing a monolayer foam with Adflex X101H and the CFAs used in the previous samples was initially challenging because of its a relatively high MFR for a foamable composition. However, by using a different extruder and a physical blowing agent, it was found that resins with higher MFR, such as Adflex X101H, could be foamed. The broader distribution of cell sizes can be attributed to the higher MFR (~8 g/10 min) for Adflex X101H. Further, the percentage of bipolymer component in Adflex X101H is greater than 50% and the xylene soluble intrinsic viscosity less than 3 dL/g.

A comparison between the results for PBA-1 and PBA-4 reveals that PBA-1 shows a more uniform cell size distribution with a slightly better density reduction (27% vs 23%) for the same rate (600 mL/min) of nitrogen injection. Increasing the nitrogen injection rate to 1,300 mL/min, as used in PBA-5 brings the results for PBA-4 to the same level as PBA-1, but the cell size distribution is not affected and remains rather broad.

Thus, it was found all of the sampled base resins foamed well using nitrogen as the physical blowing agent and have a density reduction of about 25%. Density reduction may be improved through formulation optimization (optimize the rate of blowing agent injection), type of blowing agent (nitrogen, carbon dioxide etc.), level/type of nucleating agent, and/or process optimization (hardware level and conditions level).

The rTPO foams prepared using physical blowing agents also have a large melt flow range and flexural modulus range, thus allowing for a broad scope of potential applications and foamed architecture. Combinations of different blowing agents, such as highly pressurized CO2, N2, isobutane, or CFC-derivatives, and nucleating agents, as well as process settings are also expected to allow for the 'tuning' of the foamed extrudate for specific applications or cellular foam structure.

These results from each of the samples demonstrate that multiple Catalloy rTPOs can be successfully foamed as sheets or strands using chemical foaming agents or physical blowing agents. The foamed extrudates displayed a large range of properties, allowing for a broad amount of applications. Further, the selection of chemical foaming agents or combinations thereof, or PBAs, and nucleating agents, can be utilized to tune the features of the foam extrudate for select applications. Additionally, it was noted that the foaming of the different Catalloy rTPOs did not need modification to the hardware of the system, which could reduce downtime and capital costs.

The following references are incorporated by reference in their entirety.

ASTM D792-13, Standard Test Methods for Density and Specific Gravity (Relative Density) of Plastics by Displacement ASTM D 1238L, Standard Test Method for Melt Flow Rates of Thermoplastics by Extrusion Plastometer ISO 178, Plastics—Determination of flexural properties U.S. Pat. No. 7,592,393

U.S. Pat. No. 8,008,400

EP1025169

EP0640648

EP0472946

WO2016207235

WO2016207236

US2009015678

US2012184675A

Additional embodiments of the present disclosure are provided in the following Table 6:

TABLE 6

Table 6, Embodiment 1
A foam composition comprising:
a reactor made thermoplastic polyolefin composition comprising:
    a) from 8 to 25% by weight of a crystalline polymer fraction selected from the group consisting of
        i) a propylene homopolymer having solubility in xylene at room temperature lower than 10% by weight; and
        ii) a copolymer of propylene and at least one alpha-olefin of formula $H_2C=CHR$, where R is H or a $C_2$-$C_6$ linear or branched alkyl, containing at least 85% by weight of propylene, having solubility in xylene at room temperature lower than 15% by weight; and
    b) from 75 to 92% by weight of an elastomeric fraction comprising
        i) a first elastomeric copolymer of propylene with at least one alpha-olefin of formula $H_2C=CHR$, where R is H or a $C_2$-$C_6$ linear or branched alkyl, optionally containing 0.5 to 5% by weight of a diene, the first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
        ii) a second elastomeric copolymer of propylene with at least one alpha-olefin of formula $H_2C=CHR$, where R is H or a $C_2$-$C_6$ linear or branched alkyl, optionally containing 0.5 to 5% by weight of a diene, the second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g
        wherein the bi)/bii) weight ratio ranges from 1:5 to 5:1, and,
wherein the reactor made thermoplastic polyolefin composition has a flexural modulus lower than 60 MPa, a Shore A hardness lower than 90, a tension set at 100% lower than 35%, and a melt flow rate between 0.1 and 10 g/10 min.

TABLE 6-continued

Table 6, Embodiment 2
A foam composition comprising:
a reactor made thermoplastic polyolefin composition comprising:
   a)   10-70% of a copolymer of propylene and one or more co-monomer(s)
        selected from ethylene and $CH_2$=CHR alpha-olefins where R is a 2-8 carbon
        alkyl, wherein the copolymer contains from about 0 to 8% of co-monomer(s) a
        propylene homopolymer having solubility in xylene at room temperature lower
        than 10% by weight; and
   b)   30-90% of a copolymer of ethylene and
        (i)    propylene or
        (ii)   $CH_2$=CHR alpha-olefins, where R is a 2-8 carbon alkyl radical, or
        (iii)  a combination of bi) and bii) and, optionally, minor amounts of a diene,
               with this copolymer containing from about 50% to 80% of ethylene
wherein the reactor made thermoplastic polyolefin composition has an intrinsic
viscosity [η] of a fraction soluble in xylene at room temperature (XS) of 1.8 dl/g or
more.
Table 6, Embodiment 3
A foam composition comprising:
a reactor made thermoplastic polyolefin composition comprising:
   a)   5-35% by weight of a propylene-based polymer containing 90% by weight or
        more of propylene units and 10% by weight or less of a fraction soluble in
        xylene at 25° C.;
   b)   25-50% by weight of a copolymer of ethylene and a C3-8 alpha-olefin
        containing from about 0.1% to 20% by weight of alpha-olefin units and 75% by
        weight or less of a fraction soluble in xylene at 25° C.;
   c)   30-60% by weight of a copolymer of ethylene and propylene containing from
        about 25% to 75% by weight of ethylene units and containing from about 55%
        to 95% by weight, of a fraction soluble in xylene at 25° C.;
wherein the reactor made thermoplastic polyolefin composition has a melt flow rate
between 0.1 and 6 g/10 min.
Table 6, Embodiment 4
A foam composition comprising:
a reactor made thermoplastic polyolefin composition comprising:
   a)   5-35% by weight of a propylene and ethylene copolymer having 15% by
        weight or less of a fraction soluble in xylene at 25° C. ($XS_A$) referred to the
        weight of A, and having from about 0.5 wt % to 7.0 wt % of ethylene derived
        units;
   b)   20-50% by weight of an ethylene homopolymer having 5% by weight or less of
        a fraction soluble in xylene at 25° C. ($XS_B$) referred to the weight of (B); and,
   c)   30-60% by weight of a terpolymer, wherein the terpolymer contains propylene,
        about 45% to 65% by weight of ethylene derived components, and from about
        15% to 38% by weight of 1-butene derived components, wherein the
        terpolymer has from about 30% to 85% by weight of a fraction soluble in
        xylene at 25° C. ($XS_c$), the amount of ethylene units; 1-butene units and the
        fraction $XS_c$ being referred to the weight of (C)
wherein the total weight of (A) + (B) + (C) is 100 wt %;
wherein the reactor made thermoplastic polyolefin composition has a melt flow rate
between 0.8 and 20 g/10 min.
Table 6, Embodiment 5
A foam composition comprising:
a reactor made thermoplastic polyolefin composition comprising:
   a)   5-35% by weight of a propylene homopolymer containing 10% by weight or
        less of a fraction soluble in xylene at 25° C. ($XS_A$), the amount of the fraction
        $XS_A$ being referred to the weight of A);
   b)   20-50% by weight of an ethylene homopolymer having 5% by weight or less of
        a fraction soluble in xylene at 25° C. ($XS_B$) referred to the weight of (B); and,
   c)   30-60% by weight of a terpolymer, wherein the terpolymer contains propylene,
        about 45% to 65% by weight of ethylene derived components, and from about
        15% to 38% by weight of 1-butene derived components, wherein the
        terpolymer has from about 30% to 85% by weight of a fraction soluble in
        xylene at 25° C. ($XS_c$), the amount of ethylene units; 1-butene units and the
        fraction $XS_c$ being referred to the weight of (C),
wherein the total weight of (A) + (B) + (C) is 100 wt %;
wherein the reactor made thermoplastic polyolefin composition has a melt flow rate
between 0.8 and 20 g/10 min.
Table 6, Embodiment 6
A foam composition comprising:
a reactor made thermoplastic polyolefin composition comprising:
   a)   10-60 parts by weight of a homopolymer of propylene with isotactic index
        greater than 80, or a copolymer having over 85% by weight of propylene
        with
        i)     ethylene
        ii)    $CH_2$=CHR alpha-olefins, where R is a 2-8 carbon alkyl radical, or
        iii)   combination of ai) and aii);
   b)   5-20 parts by weight of a copolymer fraction containing ethylene that is
        insoluble in xylene at ambient temperature;

TABLE 6-continued c) 37-80 parts by weight of a copolymer fraction of ethylene and
   i) propylene,
   ii) another $CH_2=CHR$ α-olefin, or
   iii) a combination of ci) and cii) and optionally, minor portions of a diene; wherein fraction c) is less than 40% by weight of ethylene, being soluble in xylene at ambient temperature, and having an intrinsic viscosity from about 1.5 to 5 dl/g, wherein the percent by weight of the sum of the (B) and (C) components with respect to the total polyolefin composition is from about 40% to 90% and the (B)/(C) weight ratio is lower than 0.4,
wherein the reactor made thermoplastic polyolefin composition has a melt flow rate between 0.35 and 35 g/10 min Table 6, Embodiment 7
A foam composition comprising:
a reactor made thermoplastic polyolefin composition comprising:
   a) from about 25 to 50%, by weight, of a crystalline propylene homopolymer with a solubility in xylene at room temperature of less than or equal to 4%, or a crystalline copolymer of propylene with ethylene or a $C_4$-$C_8$ alpha-olefin having an ethylene or alpha-olefin content 0.5 to 3%, and a solubility in xylene at room temperature of from less than or equal to 4%; and,
   b) from about 50 to 75%, by weight, of a partially amorphous copolymer of ethylene with a $C_4$-$C_8$ alpha-olefin, wherein the alpha-olefin content is from about 10 to 20%, and the copolymer is from about 10 to 40% soluble in xylene at room temperature.

Table 6, Embodiment 8
A foam composition comprising:
a reactor made thermoplastic polyolefin composition comprising:
   a) from about 60 to 85% of a broad molecular weight distribution propylene polymer having a polydispersity index from about 5 to 15 and melt flow rate of from about 40 to 75 g/10 min; and
   b) from about 15 to 40% of a partially xylene-soluble olefin polymer rubber consisting of a poly(ethylene-co-propylene) containing at least 65% by weight of ethylene, wherein the xylene-insoluble content of (B) is 25-40% by weight, measured by dissolving the polymer in xylene at 135° C., cooling the solution to 25° C., allowing to settle for 30 minutes, followed by filtering,
wherein the reactor made thermoplastic polyolefin composition has a MFR between 5 and 20 g/10 min.

Table 6, Embodiment 9
A foam composition comprising:
a reactor made thermoplastic polyolefin composition comprising:
   a) about 30% to less than 70% of a semi-crystalline polypropylene component selected from the group consisting of a propylene homopolymer, a random copolymer of propylene containing up to 8% of ethylene, a random copolymer of propylene containing up to 8% of at least one $C_4$-$C_{10}$ α-olefin, or any combination thereof, wherein the semi-crystalline polypropylene component has a monomodal molecular weight distribution; and,
   b) greater than 30% to about 70% of a bipolymer component of propylene and at least one co-monomer selected from ethylene and/or $C_4$-$C_{10}$ α-olefins, wherein the bipolymer itself has from about 50%-75% of propylene, wherein the bipolymer is partially soluble in xylene at room temperature and has an intrinsic viscosity of from about 4 to 7.5 dl/g (in decalin)
wherein the reactor made thermoplastic polyolefin composition has a MFR between 0.35 and 1 g/10 min, and an intrinsic viscosity of the xylene soluble fraction from about 4 dL/g to 6 dL/g (in decalin).

Table 6, Embodiment 10
An foam composition comprising:
a reactor made thermoplastic polyolefin composition comprising:
   a) 5-35% by weight of a propylene-based polymer containing 90% by weight or more of propylene units and 10% by weight or less of a fraction soluble in xylene at 25° C.;
   b) 25-50% by weight of an ethylene homopolymer containing 5% by weight or less of a fraction soluble in xylene at 25° C.; and,
   c) 30-60% by weight of a copolymer of ethylene and propylene containing from about 25% to 75% by weight of ethylene units and containing from about 55% to 95% by weight of a fraction soluble in xylene at 25° C.
wherein the reactor made thermoplastic polyolefin composition has a melt flow rate between 0.1 and 6 g/10 min.

Table 6, Embodiment 11
Any foam composition as herein described, wherein the reactor made thermoplastic polyolefin composition is foamed using at least one physical blowing agent (PBA) or at least one chemical foaming agent (CFA).

Table 6, Embodiment 12
Any foam composition as herein described, wherein the reactor made thermoplastic polyolefin composition is combined with at least one physical blowing agent (PBA) and a masterbatch comprising at least one nucleating agent.

Table 6, Embodiment 13
Any foam composition as herein described, wherein the at least one physical blowing agent is selected from a group comprising highly pressurized $CO_2$, $N_2$, air, propane, isobutane, butane, CFC-derivatives, argon, or combinations thereof.

TABLE 6-continued

Table 6, Embodiment 14
Any foam composition as herein described, wherein the at least one physical blowing agent is added to the reactor made thermoplastic polyolefin composition during the extruding step and is injected at about 100-3,000 mL/min, or 400-1,500 mL/min, or 500-800 mL/min, or 600 mL/min, or 1,300 mL/min.

Table 6, Embodiment 15
Any foam composition as herein described, wherein the reactor made thermoplastic polyolefin composition is combined with at least one chemical foaming agent (CFA) and a masterbatch comprising at least one nucleating agent.

Table 6, Embodiment 16
Any foam composition as herein described, wherein the at least one chemical foaming agent (CFA) is in the same masterbatch as at least one nucleating agent.

Table 6, Embodiment 17
Any foam composition as herein described, wherein the at least one chemical foaming agent (CFA) is in a different masterbatch as at least one nucleating agent.

Table 6, Embodiment 18
Any foam composition as herein described, wherein the at least one chemical foaming agent (CFA) acts as a nucleating agent.

Table 6, Embodiment 19
Any foam composition as herein described, wherein the at least one chemical foaming agent (CFA) is either endothermic or exothermic.

Table 6, Embodiment 20
Any foam composition as herein described, wherein the total amount of masterbatch in the foamed article is 5 weight % or less of the reactor made thermoplastic polyolefin composition.

Table 6, Embodiment 21
Any foam composition as herein described, wherein the total amount of masterbatch in the foamed article is 10 weight % or less of the reactor made thermoplastic polyolefin composition.

Table 6, Embodiment 22
Any foam composition as herein described, wherein the total amount of masterbatch in the foamed article is 10 weight % or less of the reactor made thermoplastic polyolefin composition.

Table 6, Embodiment 23
Any foam composition as herein described, wherein the density of the article is 80% lower than the unfoamed reactor made thermoplastic polyolefin composition.

Table 6, Embodiment 24
Any foam composition as herein described, wherein the density of the article is 60% lower than the unfoamed reactor made thermoplastic polyolefin composition Table 6, Embodiment 25
Any foam composition as herein described, wherein the range of average cell sizes of the foamed reactor made thermoplastic polyolefin composition is between about 10 to about 60 microns.

Table 6, Embodiment 26
An article comprising:
a foamed reactor made thermoplastic polyolefin composition comprising:
  a) from 8 to 25% by weight of a crystalline polymer fraction selected from the group consisting of
    i) a propylene homopolymer having solubility in xylene at room temperature lower than 10% by weight; and
    ii) a copolymer of propylene and at least one alpha-olefin of formula $H_2C=CHR$, where R is H or a $C_2$-$C_6$ linear or branched alkyl, containing at least 85% by weight of propylene, having solubility in xylene at room temperature lower than 15% by weight; and
  b) from 75 to 92% by weight of an elastomeric fraction comprising
    i) a first elastomeric copolymer of propylene with at least one alpha-olefin of formula $H_2C=CHR$, where R is H or a $C_2$-$C_6$ linear or branched alkyl, optionally containing 0.5 to 5% by weight of a diene, the first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
    ii) a second elastomeric copolymer of propylene with at least one alpha-olefin of formula $H_2C=CHR$, where R is H or a $C_2$-$C_6$ linear or branched alkyl, optionally containing 0.5 to 5% by weight of a diene, the second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g
      wherein the bi)/bii) weight ratio ranges from 1:5 to 5:1, and,
wherein the reactor made thermoplastic polyolefin composition has a flexural modulus lower than 60 MPa, a Shore A hardness lower than 90, a tension set at 100% lower than 35%, and a melt flow rate between 0.1 and 10 g/10 min.

TABLE 6-continued

Table 6, Embodiment 27
An article comprising:
a foamed reactor made thermoplastic polyolefin composition comprising:
- a) 10-70% of a copolymer of propylene and one or more co-monomer(s) selected from ethylene and $CH_2=CHR$ alpha-olefins where R is a 2-8 carbon alkyl, wherein the copolymer contains from about 0 to 8% of co-monomer(s) a propylene homopolymer having solubility in xylene at room temperature lower than 10% by weight; and
- b) 30-90% of a copolymer of ethylene and
  - (i) propylene or
  - (ii) $CH_2=CHR$ alpha-olefins, where R is a 2-8 carbon alkyl radical, or
  - (iii) a combination of bi) and bii) and, optionally, minor amounts of a diene, with this copolymer containing from about 50% to 80% of ethylene wherein the reactor made thermoplastic polyolefin composition has an intrinsic viscosity [$\eta$] of a fraction soluble in xylene at room temperature (XS) of 1.8 dl/g or more.

Table 6, Embodiment 28
An article comprising:
a foamed reactor made thermoplastic polyolefin composition comprising:
- a) 5-35% by weight of a propylene-based polymer containing 90% by weight or more of propylene units and 10% by weight or less of a fraction soluble in xylene at 25° C.;
- b) 25-50% by weight of a copolymer of ethylene and a C3-8 alpha-olefin containing from about 0.1% to 20% by weight of alpha-olefin units and 75% by weight or less of a fraction soluble in xylene at 25° C.;
- c) 30-60% by weight of a copolymer of ethylene and propylene containing from about 25% to 75% by weight of ethylene units and containing from about 55% to 95% by weight, of a fraction soluble in xylene at 25° C.;

wherein the reactor made thermoplastic polyolefin composition has a melt flow rate between 0.1 and 6 g/10 min.

Table 6, Embodiment 29
An article comprising:
a foamed reactor made thermoplastic polyolefin composition comprising:
- a) 5-35% by weight of a propylene and ethylene copolymer having 15% by weight or less of a fraction soluble in xylene at 25° C. ($XS_A$) referred to the weight of A, and having from about 0.5 wt % to 7.0 wt % of ethylene derived units;
- b) 20-50% by weight of an ethylene homopolymer having 5% by weight or less of a fraction soluble in xylene at 25° C. ($XS_B$) referred to the weight of (B); and,
- c) 30-60% by weight of a terpolymer, wherein the terpolymer contains propylene, about 45% to 65% by weight of ethylene derived components, and from about 15% to 38% by weight of 1-butene derived components, wherein the terpolymer has from about 30% to 85% by weight of a fraction soluble in xylene at 25° C. ($XS_c$), the amount of ethylene units; 1-butene units and the fraction $XS_c$ being referred to the weight of (C)

wherein the total weight of (A) + (B) + (C) is 100 wt %;
wherein the reactor made thermoplastic polyolefin composition has a melt flow rate between 0.8 and 20 g/10 min.

Table 6, Embodiment 30
An article comprising:
a foamed reactor made thermoplastic polyolefin composition comprising:
- a) 5-35% by weight of a propylene homopolymer containing 10% by weight or less of a fraction soluble in xylene at 25° C. ($XS_A$), the amount of the fraction XSA being referred to the weight of A);
- b) 20-50% by weight of an ethylene homopolymer having 5% by weight or less of a fraction soluble in xylene at 25° C. ($XS_B$) referred to the weight of (B); and,
- c) 30-60% by weight of a terpolymer, wherein the terpolymer contains propylene, about 45% to 65% by weight of ethylene derived components, and from about 15% to 38% by weight of 1-butene derived components, wherein the terpolymer has from about 30% to 85% by weight of a fraction soluble in xylene at 25° C. ($XS_c$), the amount of ethylene units; 1-butene units and the fraction XSC being referred to the weight of (C), wherein the total weight of (A) + (B) + (C) is 100 wt %;
wherein the reactor made thermoplastic polyolefin composition has a melt flow rate between 0.8 and 20 g/10 min.

Table 6, Embodiment 31
An article comprising:
a foamed reactor made thermoplastic polyolefin composition comprising:
- a) 10-60 parts by weight of a homopolymer of propylene with isotactic index greater than 80, or a copolymer having over 85% by weight of propylene with
  - i) ethylene
  - ii) $CH_2=CHR$ alpha-olefins, where R is a 2-8 carbon alkyl radical, or
  - iii) combination of ai) and aii);
- b) 5-20 parts by weight of a copolymer fraction containing ethylene that is insoluble in xylene at ambient temperature;

TABLE 6-continued c) 37-80 parts by weight of a copolymer fraction of ethylene and
    i) propylene,
    ii) another CH$_2$=CHR α-olefin, or
    iii) a combination of ci) and cii) and optionally, minor portions of a diene;
    wherein fraction c) is less than 40% by weight of ethylene, being soluble in
    xylene at ambient temperature, and having an intrinsic viscosity from about 1.5
    to 5 dl/g,
wherein the percent by weight of the sum of the (B) and (C) components with respect
to the total polyolefin composition is from about 40% to 90% and the (B)/(C) weight
ratio is lower than 0.4,
wherein the reactor made thermoplastic polyolefin composition has a melt flow rate
between 0.35 and 35 g/10 min
Table 6, Embodiment 32
An article comprising:
a foamed reactor made thermoplastic polyolefin composition comprising:
  a) from about 25 to 50%, by weight, of a crystalline propylene homopolymer with
    a solubility in xylene at room temperature of less than or equal to 4%, or a
    crystalline copolymer of propylene with ethylene or a C$_4$-C$_8$ alpha-olefin
    having an ethylene or alpha-olefin content 0.5 to 3%, and a solubility in xylene
    at room temperature of from less than or equal to 4%; and,
  b) from about 50 to 75%, by weight, of a partially amorphous copolymer of
    ethylene with a C$_4$-C$_8$ alpha-olefin, wherein the alpha-olefin content is from
    about 10 to 20%, and the copolymer is from about 10 to 40% soluble in xylene
    at room temperature.
Table 6, Embodiment 33
An article comprising:
a foamed reactor made thermoplastic polyolefin composition comprising:
  a) from about 60 to 85% of a broad molecular weight distribution propylene
    polymer having a polydispersity index from about 5 to 15 and melt flow rate of
    from about 40 to 75 g/10 min; and
  b) from about 15 to 40% of a partially xylene-soluble olefin polymer rubber
    consisting of a poly(ethylene-co-propylene) containing at least 65% by weight
    of ethylene, wherein the xylene-insoluble content of (B) is 25-40% by weight,
    measured by dissolving the polymer in xylene at 135° C., cooling the solution
    to 25° C., allowing to settle for 30 minutes, followed by filtering,
wherein the reactor made thermoplastic polyolefin composition has a MFR between 5
and 20 g/10 min.
Table 6, Embodiment 34
An article comprising:
a foamed reactor made thermoplastic polyolefin composition comprising:
  a) about 30% to less than 70% of a semi-crystalline polypropylene component
    selected from the group consisting of a propylene homopolymer, a random
    copolymer of propylene containing up to 8% of ethylene, a random copolymer
    of propylene containing up to 8% of at least one C$_4$-C$_{10}$ α-olefin, or any
    combination thereof, wherein the semi-crystalline polypropylene component
    has a monomodal molecular weight distribution; and,
  b) greater than 30% to about 70% of a bipolymer component of propylene and
    at least one co-monomer selected from ethylene and/or C$_4$-C$_{10}$ α-olefins,
    wherein the bipolymer itself has from about 50%-75% of propylene, wherein
    the bipolymer is partially soluble in xylene at room temperature and has an
    intrinsic viscosity of from about 4 to 7.5 dl/g (in decalin)
wherein the reactor made thermoplastic polyolefin composition has a MFR between
0.35 and 1 g/10 min, and an intrinsic viscosity of the xylene soluble fraction from
about 4 dL/g to 6 dL/g (in decalin).
Table 6, Embodiment 35
An article comprising:
a foamed reactor made thermoplastic polyolefin composition comprising:
  a) 5-35% by weight of a propylene-based polymer containing 90% by weight or
    more of propylene units and 10% by weight or less of a fraction soluble in
    xylene at 25° C.;
  b) 25-50% by weight of an ethylene homopolymer containing 5% by weight or
    less of a fraction soluble in xylene at 25° C.; and,
  c) 30-60% by weight of a copolymer of ethylene and propylene containing from
    about 25% to 75% by weight of ethylene units and containing from about 55%
    to 95% by weight of a fraction soluble in xylene at 25° C.
wherein the reactor made thermoplastic polyolefin composition has a melt flow rate
between 0.1 and 6 g/10 min.
Table 6, Embodiment 36
Any article as herein described, wherein the reactor made thermoplastic polyolefin
composition is foamed using at least one physical blowing agent (PBA) or at least one
chemical foaming agent (CFA).
Table 6, Embodiment 37
Any article as herein described, wherein the reactor made thermoplastic polyolefin
composition is combined with at least one physical blowing agent (PBA) and a
masterbatch comprising at least one nucleating agent.
Table 6, Embodiment 38
Any article as herein described, wherein the at least one physical blowing agent is
selected from a group comprising highly pressurized CO$_2$, N$_2$, air, propane, isobutane,
butane, CFC-derivatives, argon, or combinations thereof.

TABLE 6-continued

Table 6, Embodiment 39
Any article as herein described, wherein the at least one physical blowing agent is added to the reactor made thermoplastic polyolefin composition during the extruding step and is injected at about 100-3,000 mL/min, or 400-1,500 mL/min, or 500-800 mL/min, or 600 mL/min, or 1,300 mL/min.

Table 6, Embodiment 40
Any article as herein described, wherein the reactor made thermoplastic polyolefin composition is combined with at least one chemical foaming agent (CFA) and a masterbatch comprising at least one nucleating agent.

Table 6, Embodiment 41
Any article as herein described, wherein the at least one chemical foaming agent (CFA) is in the same masterbatch as at least one nucleating agent.

Table 6, Embodiment 42
Any article as herein described, wherein the at least one chemical foaming agent (CFA) is in a different masterbatch as at least one nucleating agent.

Table 6, Embodiment 43
Any article as herein described, wherein the at least one chemical foaming agent (CFA) acts as a nucleating agent.

Table 6, Embodiment 44
Any article as herein described, wherein the at least one chemical foaming agent (CFA) is either endothermic or exothermic.

Table 6, Embodiment 45
Any article as herein described, wherein the total amount of masterbatch in the foamed article is 5 weight % or less of the reactor made thermoplastic polyolefin composition.

Table 6, Embodiment 46
Any article as herein described, wherein the total amount of masterbatch in the foamed article is 10 weight % or less of the reactor made thermoplastic polyolefin composition.

Table 6, Embodiment 47
Any article as herein described, wherein the total amount of masterbatch in the foamed article is 10 weight % or less of the reactor made thermoplastic polyolefin composition.

Table 6, Embodiment 48
Any article as herein described, wherein the density of the article is 80% lower than the unfoamed reactor made thermoplastic polyolefin composition.

Table 6, Embodiment 49
Any article as herein described, wherein the density of the article is 60% lower than the unfoamed reactor made thermoplastic polyolefin composition Table 6, Embodiment 50
Any article as herein described, wherein the range of average cell sizes of the foamed reactor made thermoplastic polyolefin composition is between about 10 to about 60 microns.

Table 6, Embodiment 51
Any article as herein described, wherein the article is in the shape of a sheet (monolayer or multi-layer), a strand, a tube, a container, or a custom profile specific to certain applications.

Table 6, Embodiment 52
A method of making any of the articles or foam compositions as herein described, comprising melting the reactor made thermoplastic polyolefin composition, injecting one or more physical blow agents into the polymer melt at the extruder, and extruding composition through a die.

Table 6, Embodiment 53
A method of making any of the articles or foam compositions as herein described, comprising mixing a reactor made thermoplastic polyolefin composition with a masterbatch having at least one nucleating agent, melting the mixture, injecting one or more physical blow agents into the polymer melt at the extruder, and extruding composition through a die.

Table 6, Embodiment 54
A method of making any of the articles or foam compositions as herein described, comprising mixing a reactor made thermoplastic polyolefin composition with a masterbatch having at least one chemical foaming agent, melting the mixture, and extruding composition through a die, wherein the chemical foaming agent degrades to release gas, forming one or more closed cells in the melted reactor made thermoplastic polyolefin composition with the released gas.

Table 6, Embodiment 55
A method of making any of the articles or foam compositions as herein described, comprising mixing a reactor made thermoplastic polyolefin composition with a masterbatch having at least one chemical foaming agent and, optionally, at least one nucleating agent, melting the mixture, and extruding composition through a die, wherein the chemical foaming agent degrades to release gas, forming one or more closed cells in the melted reactor made thermoplastic polyolefin composition with the released gas.

What is claimed is:

1. An article comprising:
    a foamed reactor made thermoplastic polyolefin composition comprising:
    a) from 8 to 25% by weight of a crystalline polymer comprising:
        a copolymer of propylene and at least one alpha-olefin of formula $H_2C=CHR$, where R is H or a $C_2$-$C_6$ linear or branched alkyl, containing at least 85% by weight of propylene, having solubility in xylene at room temperature lower than 15% by weight; and b) from 75 to 92% by weight of an elastomeric fraction comprising
  i) a first elastomeric copolymer of propylene with at least one alpha-olefin of formula $H_2C=CHR$, where R is H, optionally containing 0.5 to 5% by weight of a diene, the first elastomeric copolymer containing from 15 to 32% by weight alpha-olefin, and having solubility in xylene at room temperature greater than 50% by weight, the intrinsic viscosity of the xylene soluble fraction ranging from 3.0 to 5.0 dl/g; and
  ii) a second elastomeric copolymer of propylene with at least one alpha-olefin of formula $H_2C=CHR$, where R is H, optionally containing 0.5 to 5% by weight of a diene, the second elastomeric copolymer containing more than 32% up to 45% by weight alpha-olefin, and having solubility in xylene at room temperature greater than 80% by weight, the intrinsic viscosity of the xylene soluble fraction ranging from 4.0 to 6.5 dl/g wherein the bi)/bii) weight ratio ranges from 1:5 to 5:1, and, wherein said reactor made thermoplastic polyolefin composition has a flexural modulus lower than 60 MPa, a Shore A hardness lower than 90, a tension set at 100% lower than 35%, and a melt flow rate between 0.1 and 10 g/10 min.

2. The article of claim 1, wherein said foamed reactor made thermoplastic polyolefin composition is foamed using at least one physical blowing agent (PBA) or at least one chemical foaming agent (CFA).

3. The article of claim 2, wherein said foamed reactor made thermoplastic polyolefin composition is combined with a masterbatch comprising at least one nucleating agent.

4. The article of claim 3, wherein said chemical foaming agent is in the same masterbatch as at least one nucleating agent, or in a different masterbatch as at least one nucleating agent.

5. The article of claim 4, wherein the total amount of masterbatch in the foamable composition is 5% by weight or less.

6. The article of claim 2, wherein said chemical foaming agent is endothermic or exothermic.

7. The article of claim 2, wherein said chemical foaming agent acts as a nucleating agent.

* * * * *